(12) United States Patent
Dop et al.

(10) Patent No.: US 11,673,423 B2
(45) Date of Patent: Jun. 13, 2023

(54) WHEEL HUB ASSEMBLY WITH EXTERIOR SENSORS POSITIONED TO AVOID INTERFERENCE

(71) Applicant: AKTIEBOLAGET SKF, Gothenburg (SE)

(72) Inventors: Gerrit-Jan Dop, Alphen aan den Rijn (NL); Alessandro Ferrero, Turin (IT); Mathieu Hubert, Turin (IT); Bernardus Maria Koperdraad, Usselstein (NL); Stijn van Eesbeek, Doorn (NL)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 17/501,547

(22) Filed: Oct. 14, 2021

(65) Prior Publication Data
US 2022/0126628 A1     Apr. 28, 2022

(30) Foreign Application Priority Data
Oct. 22, 2020   (IT) ........................ 102020000024982

(51) Int. Cl.
*F16C 19/18*      (2006.01)
*B60B 27/00*      (2006.01)
(Continued)

(52) U.S. Cl.
CPC ...... *B60B 27/0068* (2013.01); *B60B 27/0005* (2013.01); *B60B 27/0094* (2013.01);
(Continued)

(58) Field of Classification Search
CPC .... F16C 19/186; F16C 19/522; F16C 33/586; F16C 41/00; F16C 2233/00;
(Continued)

(56) References Cited

U.S. PATENT DOCUMENTS 4,203,319 A * 5/1980 Lechler ................. G01L 5/0019
73/862.541
4,341,122 A * 7/1982 Lechler ................. G01M 13/04
73/862.045

(Continued)

FOREIGN PATENT DOCUMENTS

EP        0018936 A1    11/1980
EP        2119928 A1    11/2009
(Continued)

OTHER PUBLICATIONS

Machine Translation of JP-2005214229-A (Year: 2005).*
(Continued)

*Primary Examiner* — Alan B Waits
(74) *Attorney, Agent, or Firm* — J-Tek Law PLLC; Scott T. Wakeman; Mark A. Ussai

(57) ABSTRACT

A wheel hub assembly includes inner and outer hubs rotatably coupled by first and second ballsets of rollers. A plurality of sensors for sensing strain within the outer hub generated by the ballsets are disposed on exterior mounting surface sections. These surface sections are located at radial spacing distances within empirically derived radial boundaries to prevent interference from one ballset affecting the measurements taken by sensors monitoring the other ballset. To prevent excessive distortion of strain measurements taken through the outer hub, a certain amount of hub material is required to smooth signals generated by the first and second rollers passing proximal to each sensor, thus affecting the radial location of the mounting surfaces. Further, the sensor mounting surface sections are also located within empirically derived axial boundaries determined to enable each sensor to sense strain from one ballset while avoiding the detection of strain generated by the other ballset.

7 Claims, 23 Drawing Sheets

(51) Int. Cl.
 F16C 41/00 (2006.01)
 F16C 19/52 (2006.01)
 F16C 33/58 (2006.01)

(52) U.S. Cl.
 CPC .......... F16C 19/186 (2013.01); F16C 19/522 (2013.01); F16C 33/586 (2013.01); F16C 41/00 (2013.01); *F16C 2233/00* (2013.01); *F16C 2326/02* (2013.01)

(58) Field of Classification Search
 CPC ............. F16C 2326/02; B60B 27/0005; B60B 27/0068; B60B 27/0094
 See application file for complete search history.

(56) References Cited

U.S. PATENT DOCUMENTS

| | | | | |
|---|---|---|---|---|
| 5,140,849 | A * | 8/1992 | Fujita | G01P 3/443 73/862.541 |
| 6,546,785 | B1 * | 4/2003 | Discenzo | G01N 29/022 73/61.41 |
| 2008/0095483 | A1 * | 4/2008 | Duret | F16C 33/58 702/42 |
| 2009/0252444 | A1 | 10/2009 | Duret et al. | |
| 2010/0262383 | A1 * | 10/2010 | Isobe | G01L 5/0019 702/42 |
| 2022/0049955 | A1 * | 2/2022 | Lou | G01B 21/22 |

FOREIGN PATENT DOCUMENTS

| | | | |
|---|---|---|---|
| EP | 2107260 B1 | 5/2011 | |
| EP | 2360384 A1 | 8/2011 | |
| FR | 2929670 B1 | 12/2010 | |
| JP | 2005214229 A * | 8/2005 | ............ F16C 19/186 |
| JP | 2009041704 A | 2/2009 | |
| WO | 0177634 A3 | 8/2003 | |

OTHER PUBLICATIONS

Written Opinion and Search Report from the Italian Patent Office dated Jun. 30, 2021 in related Italian application No. 102020000024982.

* cited by examiner

WHEEL HUB ASSEMBLY WITH EXTERIOR SENSORS POSITIONED TO AVOID INTERFERENCE

CROSS-REFERENCE

This application claims priority to Italian Patent Application No. 102020000024982 filed on Oct. 22, 2020, the entire contents of which are fully incorporated herein by reference.

BACKGROUND OF THE INVENTION

The present invention relates to bearings, and more particularly to sensorized wheel hub assemblies.

Wheel hub assemblies or wheel hub bearings are generally known and are used to rotatably couple wheels with vehicles. Such assemblies include an inner hub, an outer hub disposed about the inner hub and one or two rows of rolling elements coupling the inner and outer hubs. One hub is fixed and the other rotates abouts a central axis so as to permit rotation of the wheel with respect to the vehicle. Certain wheel hub assemblies are "sensorized" or provided with one or more sensors for determining certain characteristics of the hub assembly, such as rotational speed, angular position, etc.

SUMMARY OF THE INVENTION

The present invention is a sensorized wheel hub assembly for rotatably connecting a wheel with at least one of a shaft and a chassis. The wheel hub assembly comprises an inner hub rotatable about a central axis and having opposing inboard and outboard axial ends, a radial flange extending outwardly from the outboard axial end and connectable with the wheel. The inner hub further has an inner circumferential surface defining a central bore for receiving the shaft, and an opposing outer circumferential surface, the outer surface providing an inboard inner race and an outboard inner race spaced axially from the inboard inner race. An outer hub is disposed about the inner hub, is connectable with the chassis and has inboard and outboard axial ends, an outer circumferential surface and an inner circumferential surface, the inner surface providing an inboard outer race and an outboard outer race spaced axially from the inboard outer race. Further, a first ballset of first rollers is disposed between the inboard inner race and the inboard outer race and contacts the inboard outer race along a first circular contact path, the center of each first roller traversing a first pitch circle about the central axis. Any perpendicular line extending between the contact path and the pitch circle defines a first angle ($\alpha 1$) with respect to any radial plane through the central axis and intersects the central axis at a first intersection point. A second ballset of second rollers is disposed between the outboard inner race and the outboard outer race and contacts the outboard outer race along a second circular contact path, the center of each second roller traversing a second pitch circle about the central axis. Any perpendicular line extending between the second contact path and the second pitch circle defines a second angle ($\alpha 2$) with respect to any radial plane through the central axis and intersects the central axis at a second intersection point, the first and second intersection points being spaced apart by an axial distance (DA). Furthermore, at least one and preferably a plurality of sensors are each configured to sense strain within the outer hub generated by one of the first and second ballsets, the outer hub has at least one exterior sensor mounting surface section located a radial spacing distance (RS) from the central axis, the at least one sensor being disposed on the mounting surface section. The radial spacing distance has a value less than a radial boundary distance (RB) defined as follows: $RS < RB = [DA \times \sin(90°-\alpha 1) \times \sin(90°-\alpha 2)]/\sin(\alpha 1+\alpha 2)$.

Also, to prevent excessive distortion of the strain measurements or signals through outer hub, a certain amount of hub material is required to "smooth" the signals generated by the first and second rollers passing proximal to each sensor. Thus, the outer hub must have a certain minimum material thickness, resulting in the first and second radial thicknesses, between each of the first and second races and the outer surface of the outer hub, each having a value of at least three millimeters.

Additionally, for monitoring the first or inboard ballset, one or more mounting surface sections are located axially between first and second circumferential boundary lines on a first cylindrical boundary surface having a diameter of twice the radial spacing distance. Similarly, to monitor the second or outboard ballset, one or more mounting surface sections are located axially between third and fourth circumferential boundary lines on a second cylindrical boundary surface having a diameter of twice the radial spacing distance

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Figure 1:
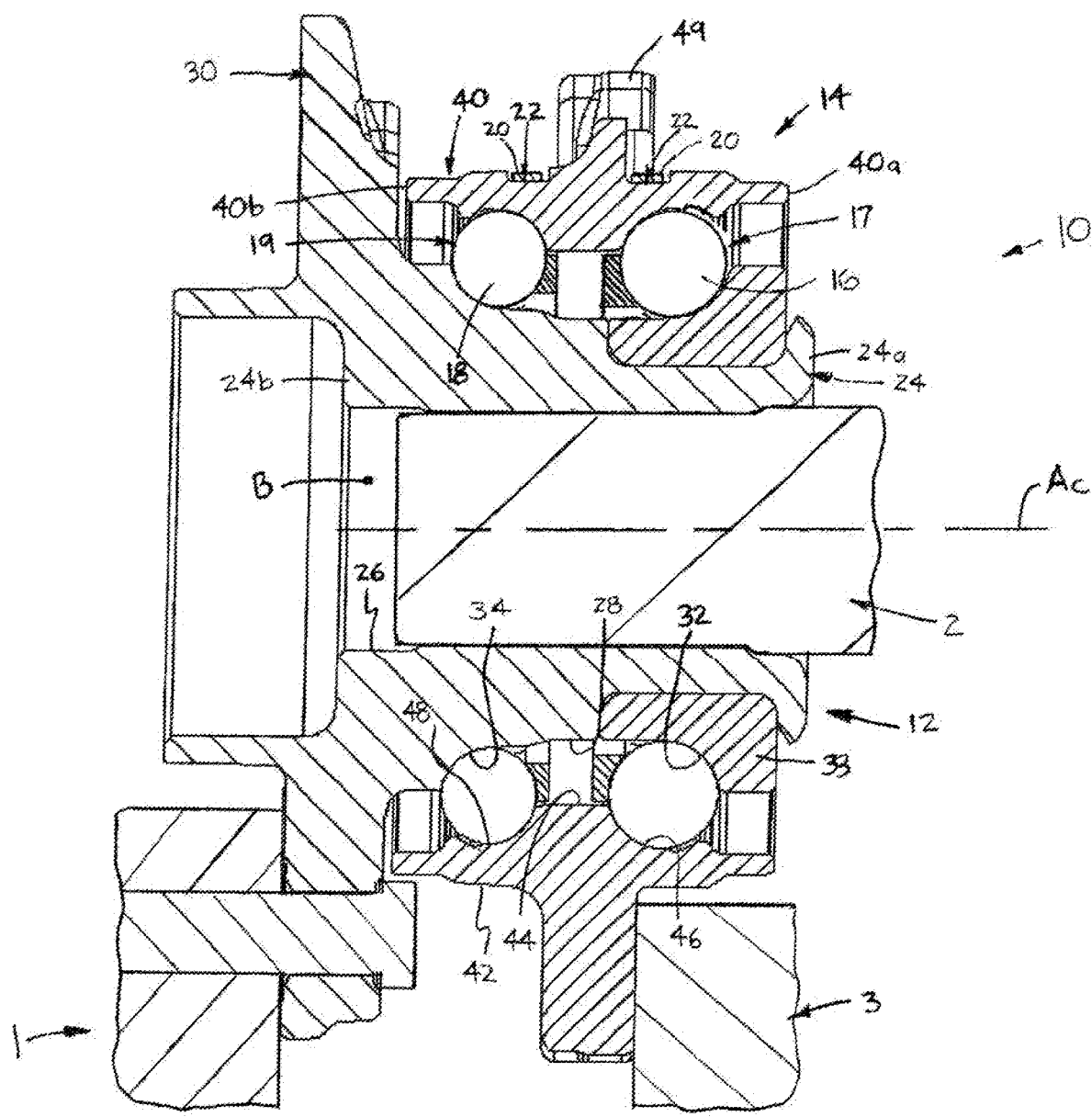
FIG. 1 is an axial cross-sectional view of a wheel hub assembly in accordance with the present invention, shown connected with a wheel, a chassis and a shaft.

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-19 a sensorized wheel hub assembly 10 for rotatably connecting a wheel 1 with a shaft 2 and/or a chassis 3 of a vehicle (e.g., a car, truck, etc.). The wheel hub assembly 10 basically comprises an inner hub 12, which is preferably rotatable about a central axis $A_C$, a fixed, outer hub 14 disposed about the inner hub 12, and first and second ballsets 17, 19 of rollers 16, 18, respectively, disposed between the inner and outer hubs 12, 14 and spaced axially apart. At least one and preferably a plurality of sensors 20 are configured to sense strain within the outer hub 14 generated by one of the first and second ballsets 17 or 19. Each sensor 20 is disposed upon an exterior mounting surface section 22 of the outer hub 14 that is located to avoid "cross-talking", that is, the interference of strain generated by one of the ballsets 17 or 19 affecting the results of strain measurements being taken on the other ballset 19, 17, as described in detail below.

Figure 2:
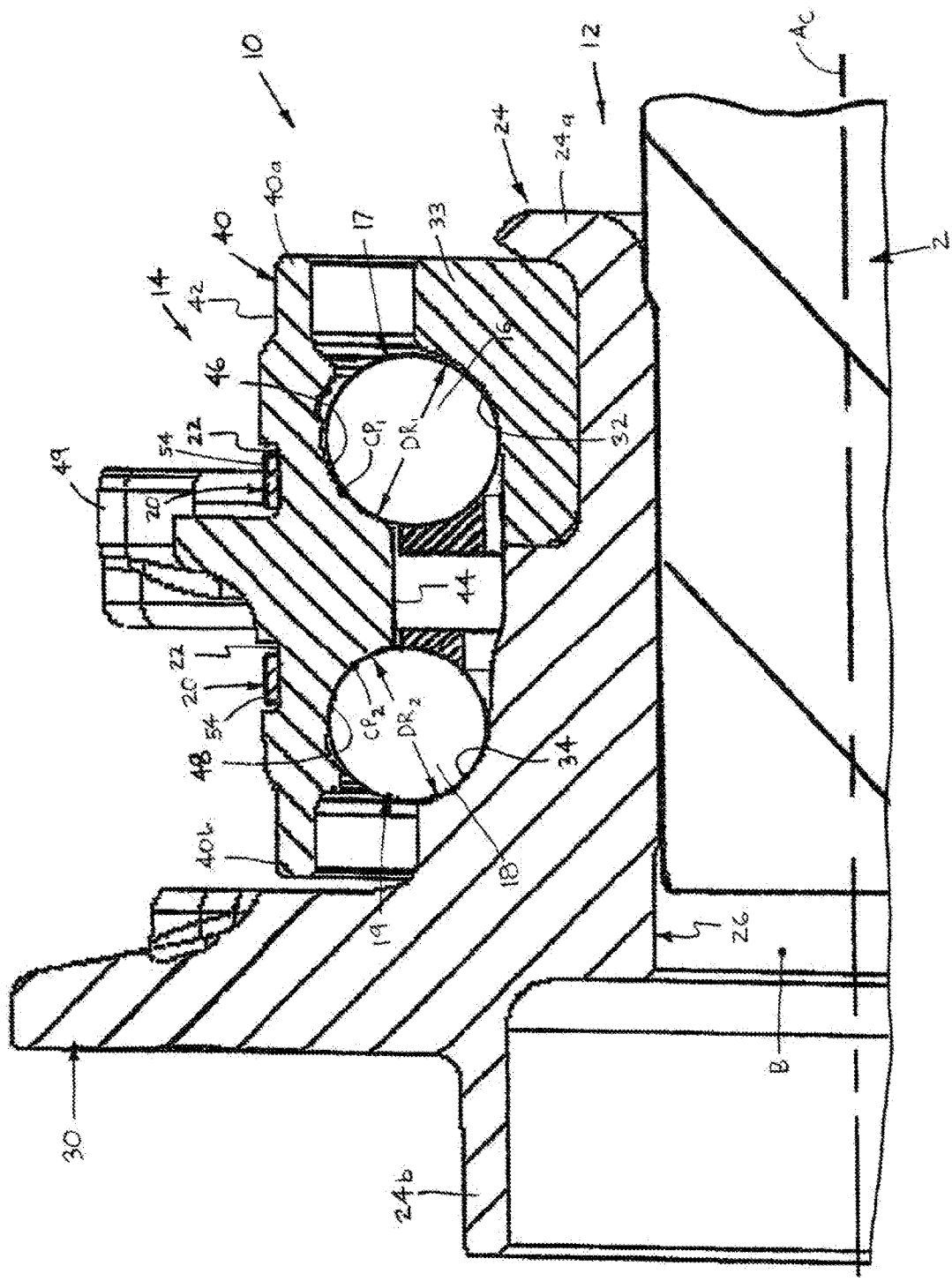
FIG. 2 is an enlarged, broken-away view of an upper portion of FIG. 1, shown separate from other vehicle components.
Figure 3:
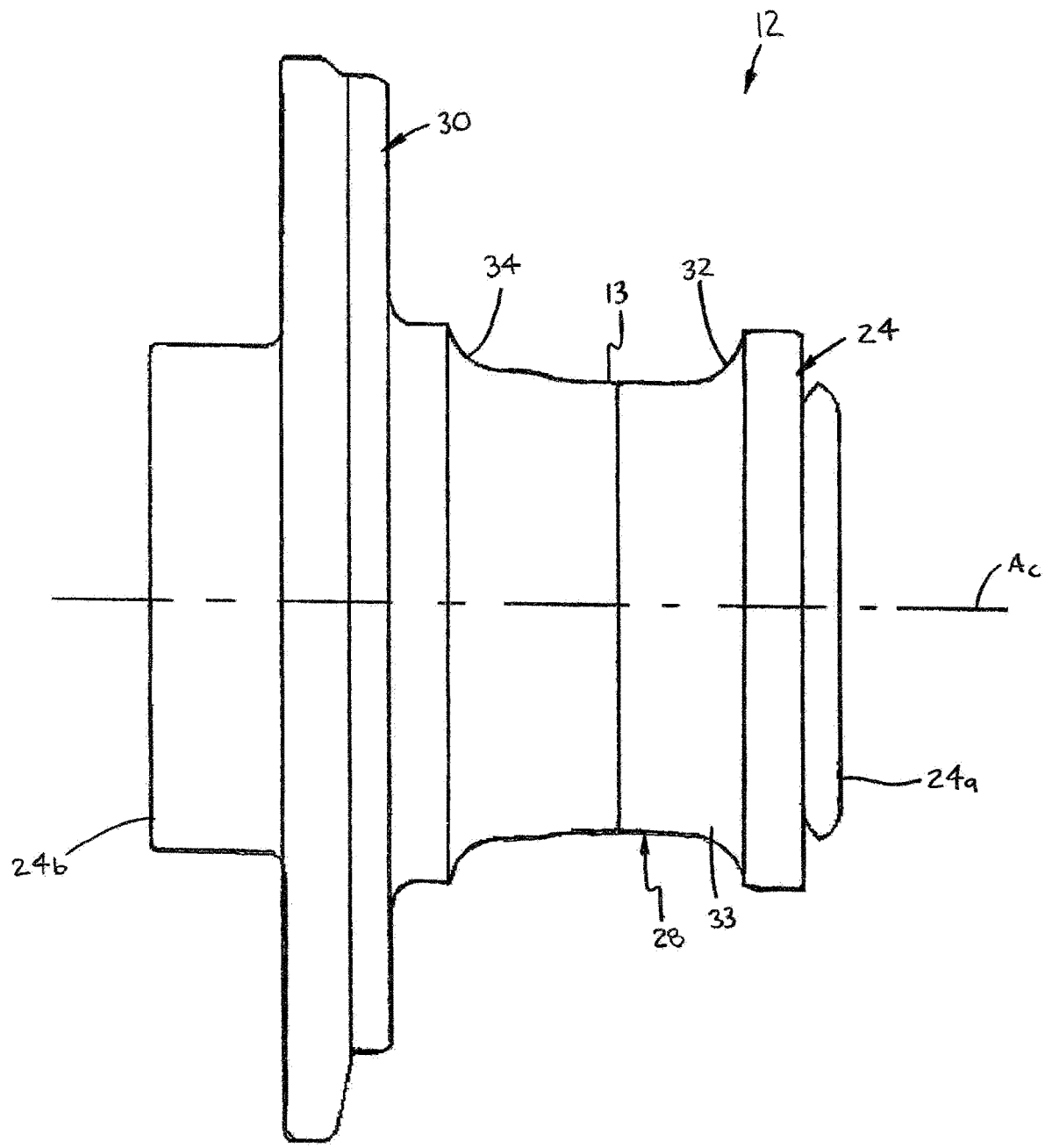
FIG. 3 is a side plan view of an inner hub of the wheel hub assembly.
Figure 4:
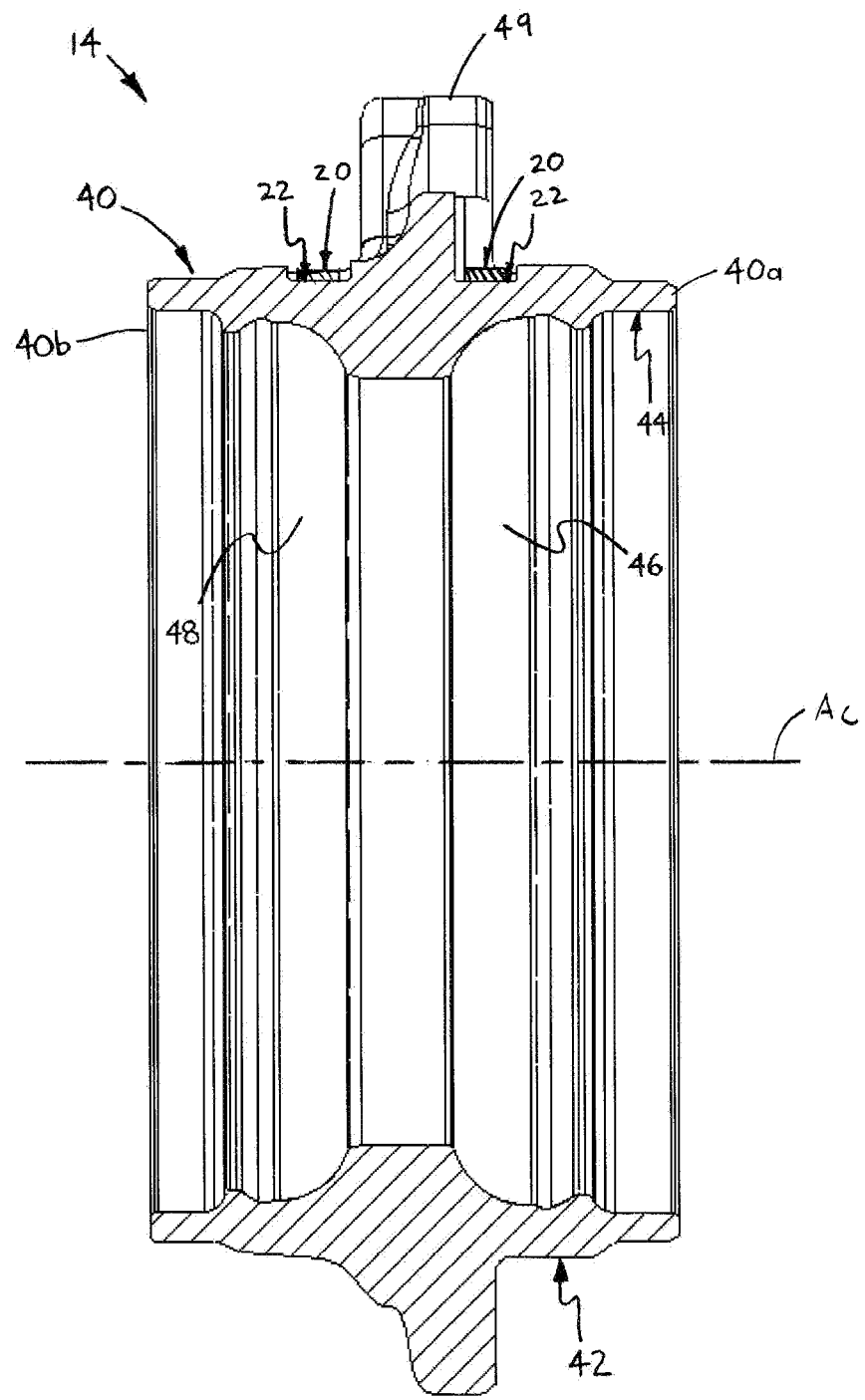
FIG. 4 is an axial cross-sectional view of an outer hub of the wheel hub assembly, shown with pockets providing sensor mounting surface sections.

Referring now to FIGS. 1-3, the inner hub 12 includes a generally cylindrical or tubular body 24 having opposing inboard and outboard axial ends 24a, 24b, respectively, an inner circumferential surface 26 and an opposing outer circumferential surface 28. Preferably, a radial flange 30 extends outwardly from the outboard axial end 24b and is connectable with the wheel 1 so as to mount the wheel 1 to the vehicle. The inner circumferential surface 26 defines a central bore B for receiving the shaft 2 and preferably includes a plurality of splines (not indicated) mateable or coupleable with a set of splines of the shaft 2. Also, the outer circumferential surface 28 provides an inboard inner race 32, preferably on an annular insert 33, and an outboard inner race 34 spaced axially from the inboard inner race 32.

Referring now to FIGS. 1, 2 and 4-8, the outer hub 14 is connectable with the chassis 3 (i.e., through a steering knuckle or suspension) and includes a generally cylindrical or tubular body 40. The tubular body 40 has inboard and outboard axial ends 40a, 40b, respectively, an outer circumferential surface 42, and an inner circumferential surface 44. The hub outer surface 42 provides the one or more sensor mounting surface sections 22, as described in detail below, and one or more mounting lugs 49 extend radially outwardly from the outer surface 42 and are connectable with the steering knuckle or suspension. The inner surface 44 provides an inboard outer race 46 and an outboard outer race 48 spaced axially from the inboard outer race 46. Further, a first radial thickness $t_{R1}$ is defined between the inboard outer race 46 and the at least one mounting surface section 22 and a second radial thickness $t_{R2}$ is defined between the outboard outer race 48 and the at least one sensor mounting surface section 22. Each one of the first and second radial thicknesses $t_{R1}$, $t_{R2}$ has a value of at least three millimeters, for reasons discussed below.

Still referring to FIGS. 1, 2 and 4-8, the first ballset 17 of first rollers 16 are disposed between the inboard inner race 32 and the inboard outer race 46, each first roller 16 having a first diameter $DR_1$. Similarly, the second ballset 19 of rollers 18 are disposed between the outboard inner race 34 and the outboard outer race 48, each second roller 18 having a second diameter $DR_2$. The two ballsets 17, 19 rotatably couple the inner and outer hubs 12, 14, such that the inner hub 12 rotates within the outer hub 14 and about the central axis $A_C$.

As indicated in FIGS. 2 and 4-8, the first ballset 17 of first rollers 16 contact the inboard outer race 46 along a first circular contact path $CP_1$, and similarly contact the inboard inner race 32 along a corresponding circular contact path (not indicated), while the center of each first roller 16 traverses a first pitch circle $PC_1$ about the central axis $A_C$. These contact paths $CP_1$ are offset from a plane $PL_1$ containing the pitch circle $PC_1$ to enable the wheel hub assembly 10 to support both radial and axial loading, as is well known in the bearing art. As such, any perpendicular line $LP_1$ extending between the contact path $CP_1$ and the pitch circle $PC_1$ defines a first contact angle α1 with respect to any radial plane (e.g., plane $PL_1$) through the central axis $A_C$, as is well known to those skilled in the art of bearings. Such a line $LP_1$ may be extended to intersect the central axis $A_C$ at a first intersection point $IP_1$, for reasons discussed below.

Correspondingly, the second ballset 19 of the second rollers 18 contact the outboard outer race 48 along a second circular contact path $CP_2$, and likewise contact the outboard inner race 34 along a circular contact path (not indicated), while the center of each second roller 18 traverses a second pitch circle $PC_2$ about the central axis $A_C$. As with the first ballset 17, any perpendicular line $LP_2$ extending between the second contact path $CP_2$ and the second pitch circle $PC_2$ defines a second angle α2 with respect to any radial plane (e.g., $PL_2$) through the central axis $A_C$. Such a line $LP_2$ may be extended to intersect the central axis $A_C$ at a second intersection point $IP_2$, the first and second intersection points $IP_1$, $IP_2$ being spaced apart by an axial distance DA, which is discussed in further detail below.

In certain presently preferred constructions as shown in FIGS. 1, 2, the first rollers 16 of the first ballset 17 are each sized diametrically larger than the rollers 18 of the second ballset 19. However, the rollers 16, 18 may alternatively be substantially equally sized (not shown) or the second rollers 18 may be sized larger than the first rollers 16 (not depicted). Further, the rolling elements 16, 18 are preferably spherical rollers or "balls", but may instead be formed as any other type of rolling element (e.g., cylinders, needles, toroidals, etc.) or/and may be of differing types, such as for example, a combination of spherical rollers 16 and cylindrical rollers 18.

Referring now to FIGS. 9-21, the outer hub 14 has at least one continuous circumferential sensor mounting surface section 23 or/and a set 27 of a plurality of circumferentially spaced arcuate mounting surface sections 25, which is/are situated at specific locations as described in detail below. Also, the at least one sensor 20 preferably includes at least one set 21 of a plurality of the sensors 20 each disposed on the continuous circumferential mounting surface section 23 and spaced circumferentially apart or each disposed on a separate one of the arcuate mounting surface sections 25. A single set 21 of the sensors 20 may be utilized in applications where it is desired to analyze loading on only one of the ballsets 17, 19.

However, in most constructions, the wheel hub assembly 10 preferably includes two sets 21A, 21B of the sensors 20, specifically, a first set 21A of the sensors 20 located to detect strain generated by the first ballset 17 and a second set 21B of the sensors 20 located to detect strain generated by the second ballset 19. As such, the outer hub 14 has two continuous mounting surface sections 23A, 23B, or two sets 27A, 27B of arcuate mounting surface sections 25, or a combination of a single continuous surface section 23 and one set 27 of arcuate surface sections 25. More specifically, in certain applications as shown in FIGS. 7-14, the outer hub 14 is formed with first and second, axially-spaced continuous circumferential sensor mounting surface sections 23A, 23B each located generally adjacent to a separate one of the outer races 46, 48, respectively. In other constructions as depicted in FIGS. 15-21, the outer hub 14 is provided with first and second, axially-spaced sets 27A, 27B of a plurality of circumferentially spaced arcuate mounting surface sections 25. Although not shown, the outer hub 14 may be formed with a combination of one continuous mounting surface section 23 and one set 27 of arcuate mounting surface sections 25.

Further, depending on the particular structure of a specific outer hub 14, each sensor 20 of the first sensor set 21A is disposed on the first continuous circumferential mounting surface section 23A or on a separate one of the arcuate mounting surface sections 25 of the first set 27A of arcuate mounting surface sections 25. Likewise, each sensor 20 of the second sensor set 21B is disposed on the second continuous circumferential mounting surface section 23B or on a separate one of the arcuate mounting surface sections 25 of the second set 27B of arcuate mounting surface sections 25. Although depicted in the drawing figures as being at least generally axially aligned (e.g., as shown in FIGS. 9, 10, 18 and 19), the sensors 20 of each sensor set 21A, 21B may be "staggered" or located at different angular or circumferential positions in comparison with the sensors 20 of the other sensor set 21B, 21A.

Referring now to FIGS. 5-8, to ensure that each of the one or more sensors 20 only detect strain generated by one of the two ballsets 17 or 19 and are prevented from sensing strain from the other ballset 19, 17, a phenomena referred to as "cross-talking" as discussed below, the exterior sensor mounting surface sections 22 are located within empirically determined boundaries within which cross-talking is substantially minimal or negligible. More specifically, the outer hub 14 is formed having (e.g., forged dimensions) or provided with (e.g., by machining) exterior mounting surface sections 22 situated within prescribed radial and axial boundaries determined to substantially insulate or isolate the sensors 20 mounted thereon from the effects of cross-talking. First, the one or more sensor mounting surface sections 22 are located at a radial spacing distance RS from the central axis $A_C$ which has a value of less than a radial boundary distance RB, defined as follows and depicted in FIGS. 5 and 7:

$$RS<RB=[DA\times\sin(90°-\alpha 1)\times\sin(90°-\alpha 2)]/\sin(\alpha 1+\alpha 2).$$

Figure 5:
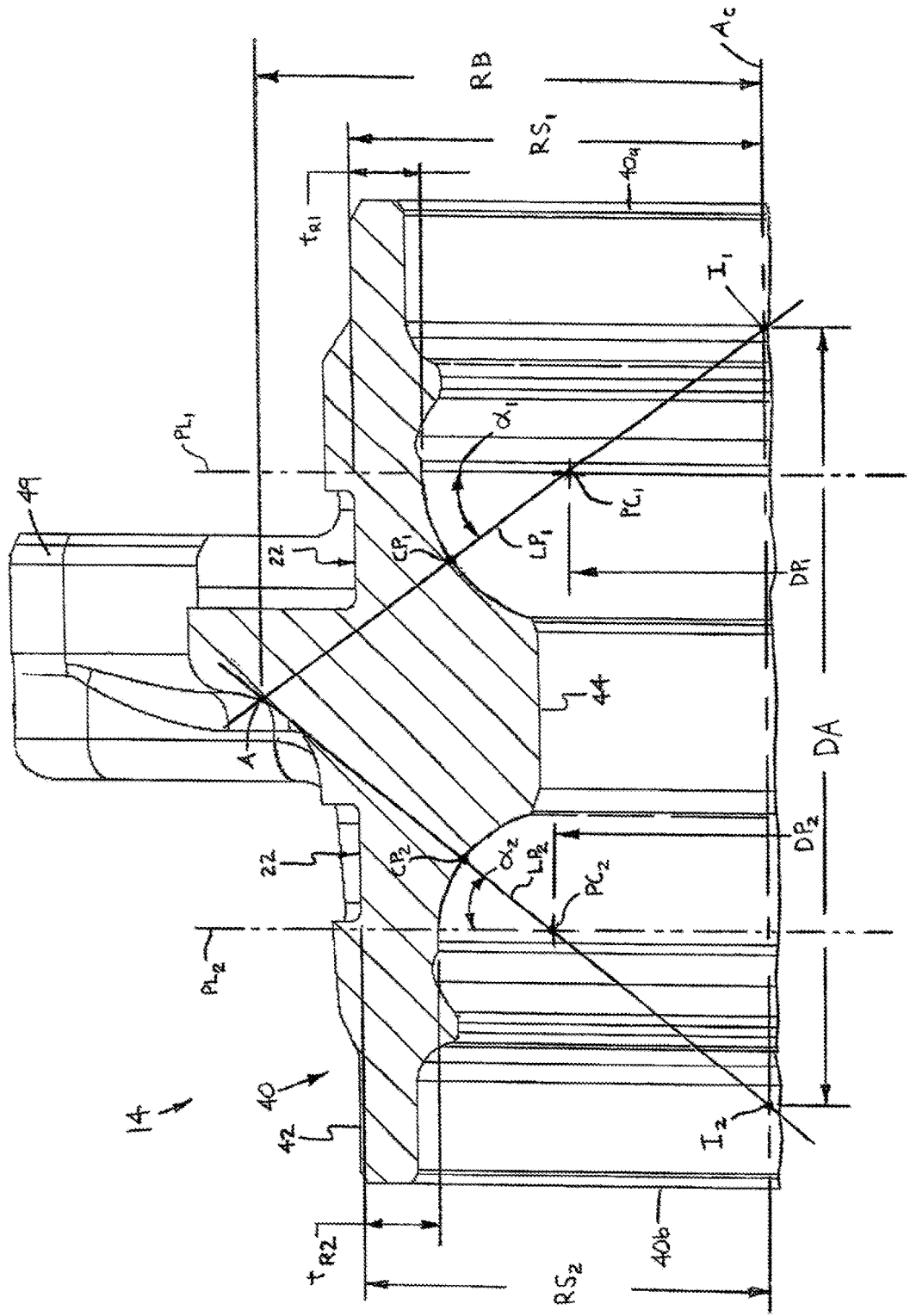
FIG. 5 is a broken-away view of an upper portion of FIG. 4, indication a preferred method of locating of the radial position of sensor mounting surface sections on an outer hub provided with annular pockets.
Figure 7:
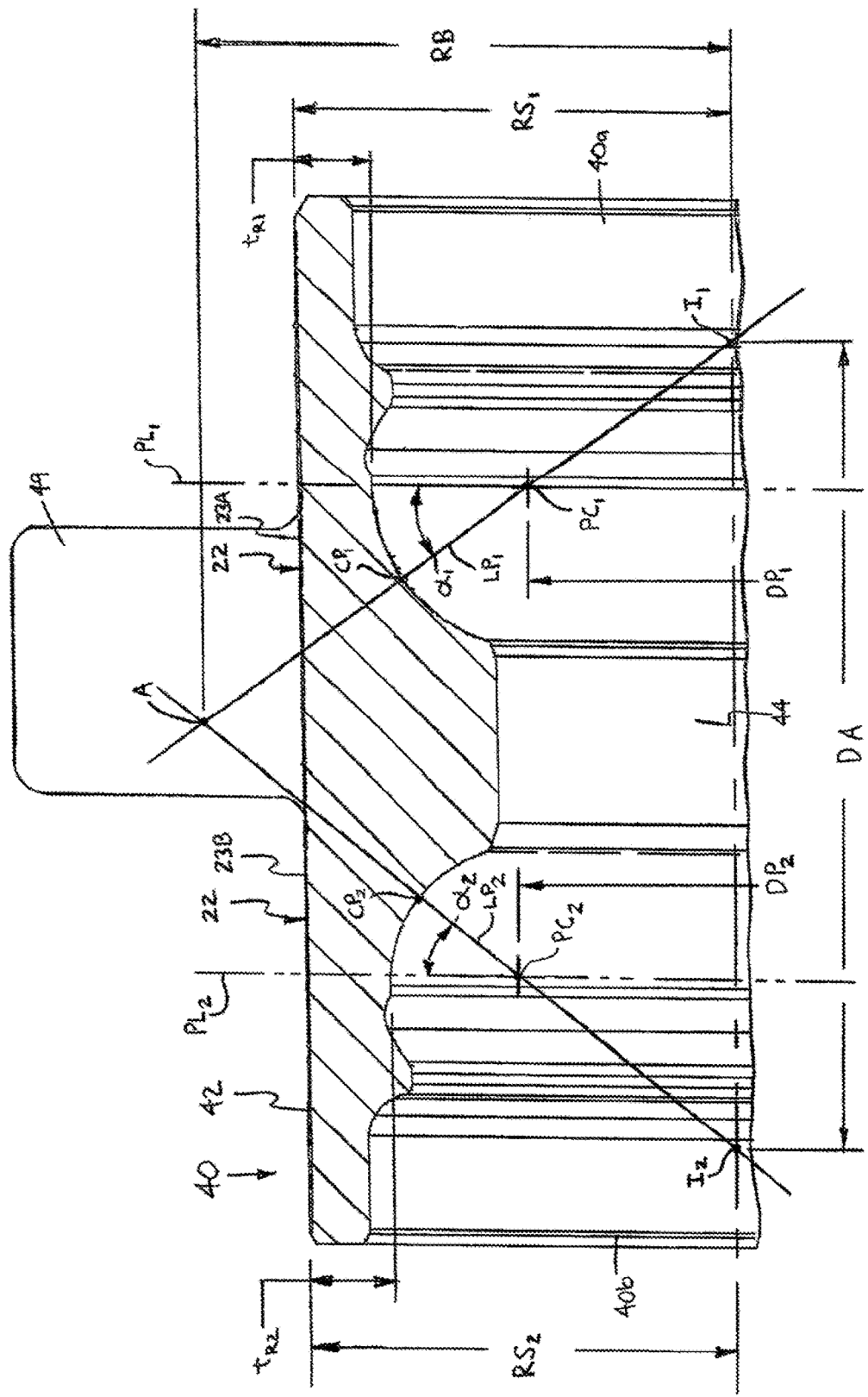
FIG. 7 is a broken-away view of an outer hub formed with sensor mounting surface sections provided directly on a hub outer surface, showing the preferred method of locating of the radial position of sensor mounting surface sections.

The radial boundary distance RB also corresponds to the radial spacing (from the central axis $A_C$) of the intersection A of any of the two lines $LP_1$, $LP_2$ extending between each pitch circle $PC_1$, $PC_2$ and the associated contact path $CP_1$, $CP_2$ which lie within the same plane (none indicated) containing the central axis $A_C$, as depicted in FIGS. 5 and 7. Although the mounting surface sections 22 for each set of sensors 21A, 21B are preferably located at substantially the same radial spacing distance RS, the mounting surface section(s) 22 for each of the two sensor sets 21A, 21B may instead be positioned at different, first and second radial spacing distances $RS_1$, $RS_2$, respectively.

Further, to prevent excessive distortion of the strain measurements or signals taken through the outer hub 14, a certain amount of hub material is required to "smooth" the strain signals generated by the rollers 16 or 18 when passing proximal to each sensor 20. This minimum material requirement is the purpose for the hub 14 having the first and second radial thicknesses $t_{R1}$, $t_{R2}$ with a value of at least three millimeters (3 mm), as described above. Furthermore, the value of the first and second radial thicknesses $t_{R1}$, $t_{R2}$ affects the radial spacing distance RS of the sensor mounting surface sections 22.

Specifically, the diameters $DR_1$, $DR_2$ of the rollers 16, 18, the diameters $DP_1$, $DP_2$ of the pitch circles $PC_1$, $PC_2$ and the locations of the ball contact paths $CP_1$, $CP_2$ (and thus contact angles $\alpha_1$, $\alpha_2$) are all established by the loading requirements of each ballset 17, 19. Therefore, to provide the required radial thicknesses $t_{R1}$, $t_{R2}$, the radial spacing distance RS of any sensor mounting surface 22 must be greater than the sum of half the diameter $DP_1$, $DP_2$ of each pitch circle $PC_1$, $PC_2$, half the diameter $DR_1$, $DR_2$ of each roller 16, 18, respectively, and the minimum material thickness $t_{R1}$, $t_{R2}$, as expressed as follows:

$$RS > (DP_N/2) + (DR_N/2) + 3 \text{ mm; where } DP_N = DP_1 \text{ or } DP_2 \text{ and } DR_N = DR_1 \text{ or } DR_2$$

Therefore, the radial spacing distance RS (or $RS_1$ and $RS_2$) for each of the mounting surfaces 20 of the two preferred sets of sensors 21A, 21B can be expressed by the following equation which accounts for both the cross-talking and signal distortion considerations:

$$(DP_N/2) + (DR_N/2) + 3 \text{ mm} < RS < RB = [DA \times \sin(90° - \alpha 1) \times \sin(90° - \alpha 2)]/\sin(\alpha 1 + \alpha 2)$$

Figure 6:
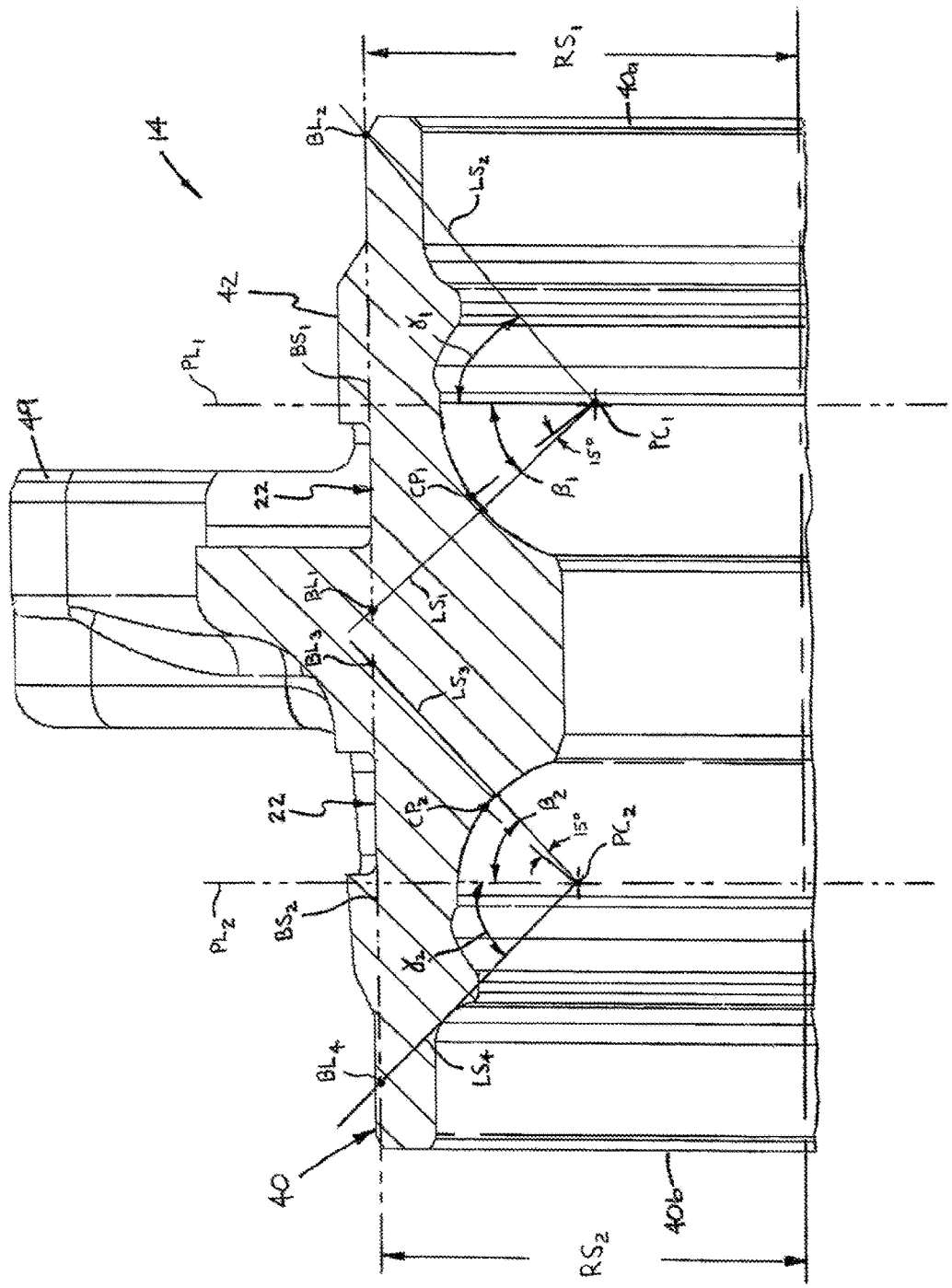
FIG. 6 is another view of the portion of the upper hub of FIG. 5, showing a preferred method of locating the axial boundaries for the sensor mounting surface sections.
Figure 8:
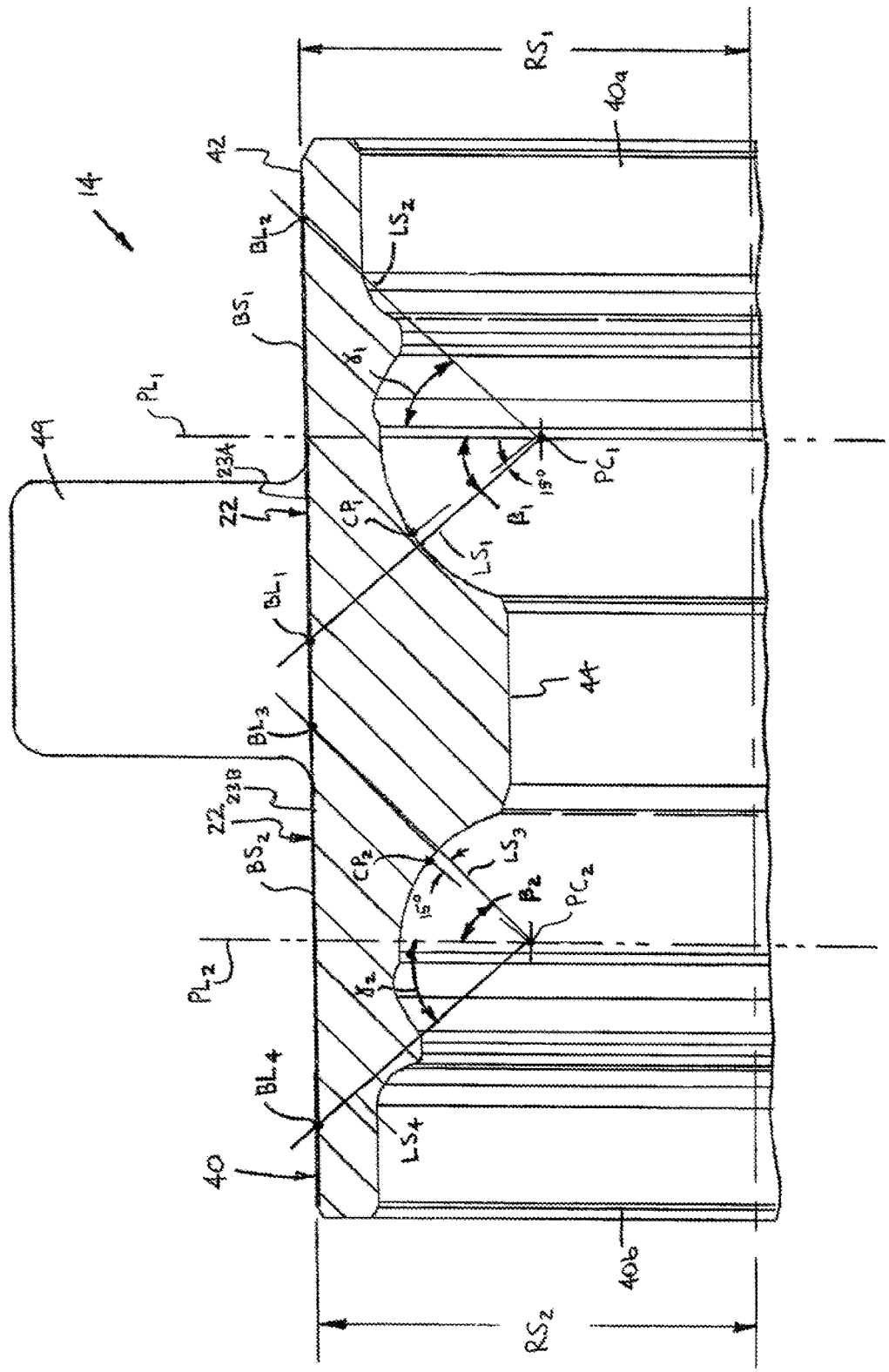
FIG. 8 is another view of the portion of the upper hub of FIG. 7, showing the preferred method of locating the axial boundaries for the sensor mounting surface sections.
Figure 9:
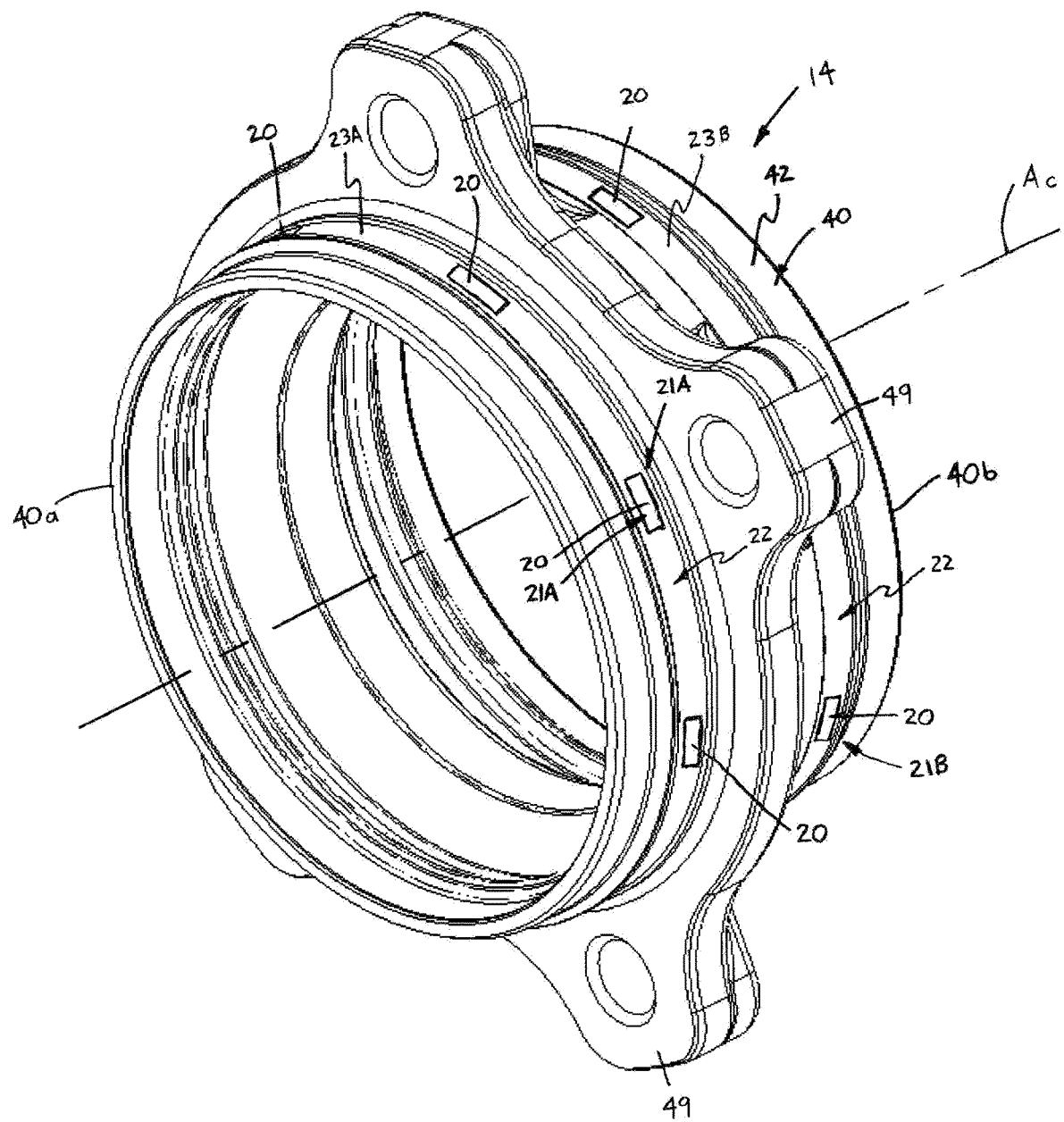
FIG. 9 is a perspective view of an outer hub taken from an inboard end, shown with continuous circumferential sensor mounting surface sections.
Figure 10:
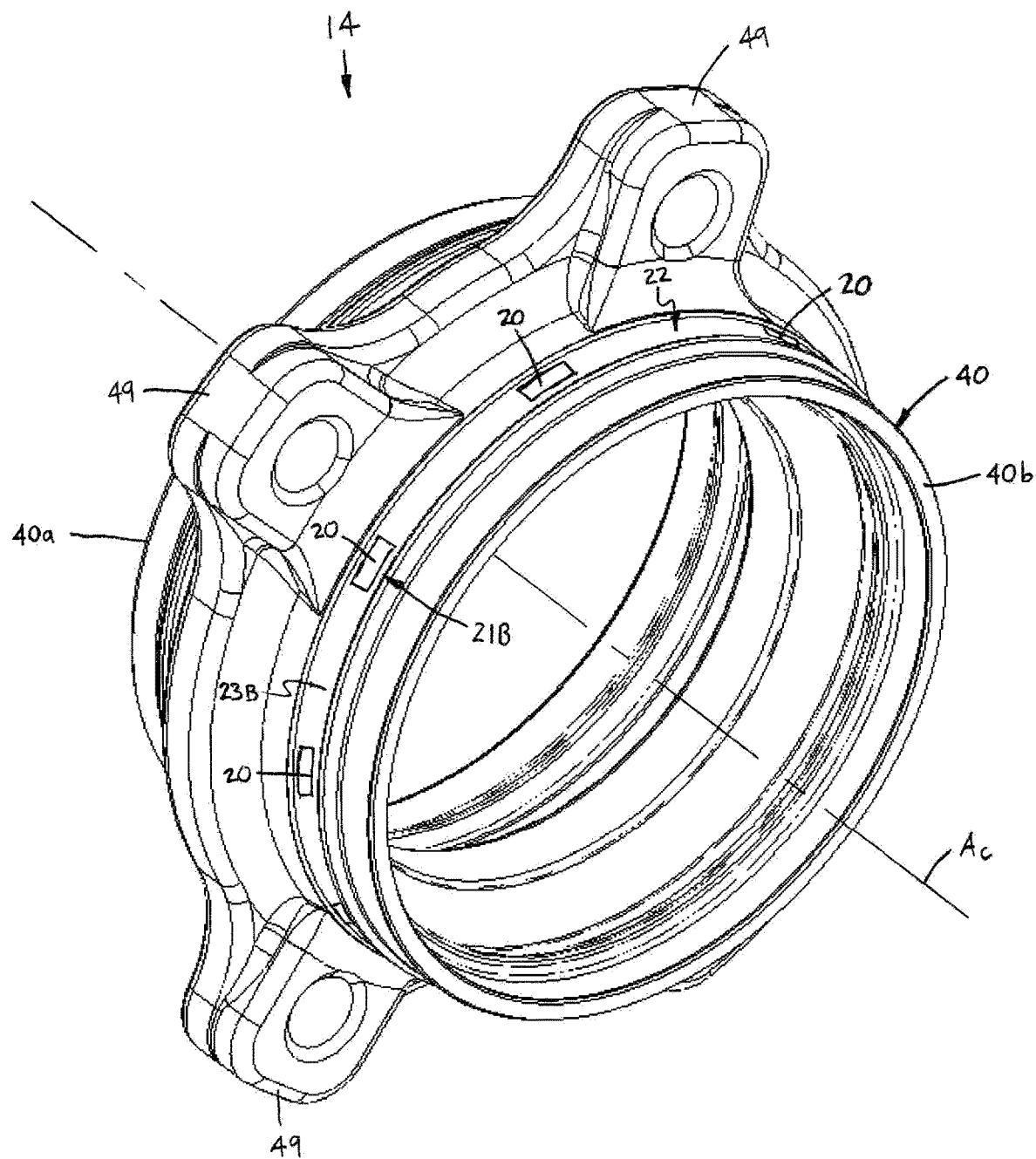
FIG. 10 is a perspective view of an outer hub of FIG. 9 taken from an outboard end, shown with continuous circumferential sensor mounting surface sections.
Figure 11:
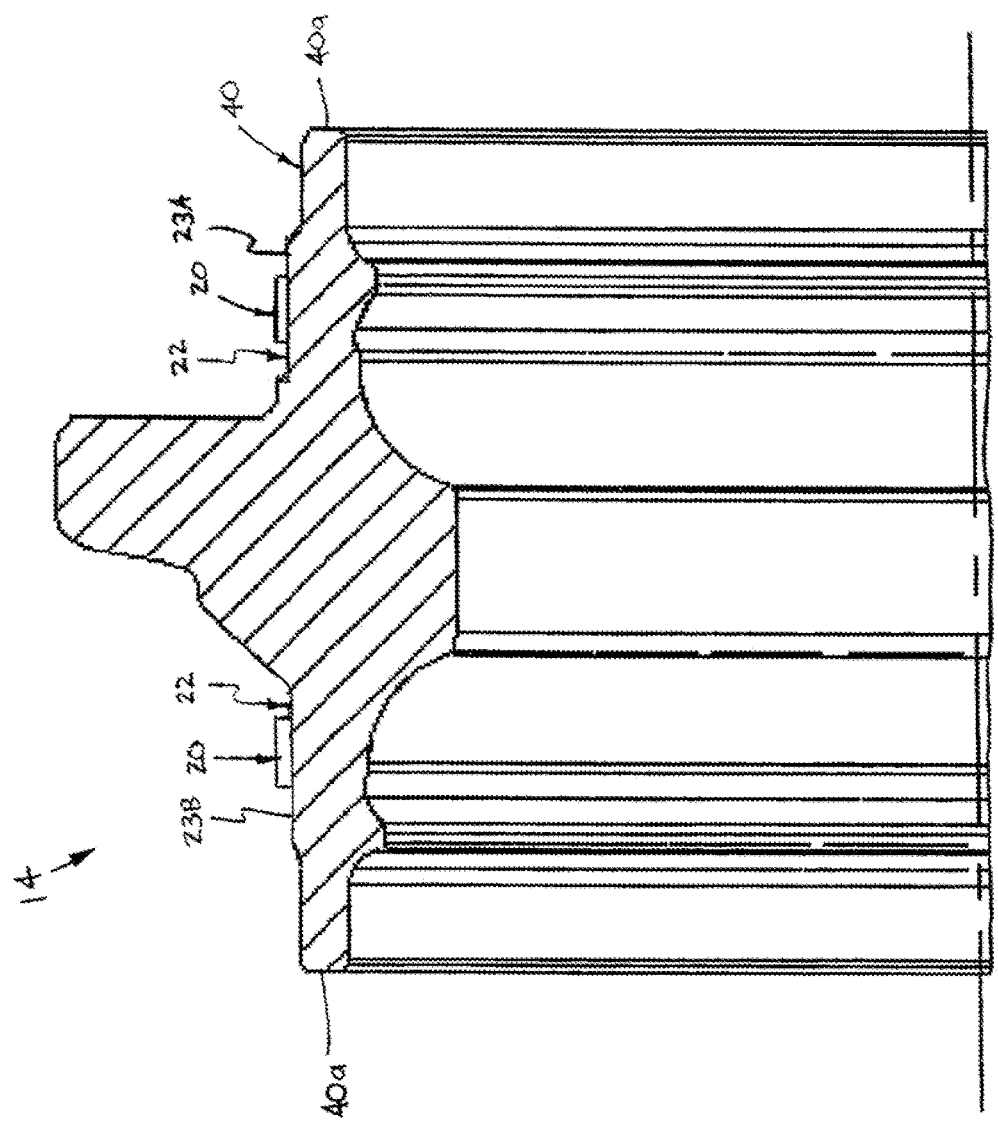
FIG. 11 is a broken-away, axial cross-sectional view of the outer hub of FIG. 9.

Referring now to FIGS. 6 and 8, in addition to the radial spacing considerations as discussed in detail above, the sensor mounting surface sections 20 should be located within certain, empirically or experimentally determined axial boundaries to both enable detection of strain generated by the ballset 17, 19 being monitored while avoiding cross-talking as described above and in greater below. First, for monitoring the first or inboard ballset 17, the first continuous circumferential sensor mounting surface section 23A or the first set 27A of arcuate mounting surface sections 25 is preferably located axially between first and second circumferential boundary lines $BL_1$, $BL_2$ on a first cylindrical boundary surface $BS_1$ having a diameter of twice the radial spacing distance $RS_1$. The first circumferential boundary line $BL_1$ is defined as the intersection of the first cylindrical boundary surface $BS_1$ by any straight line $LS_1$ extending from the first pitch circle $PC_1$ in a direction toward the outer hub outboard axial end 40b, which forms an angle $\beta_1$ with respect to any plane (e.g., $PL_1$) perpendicular to the central axis $A_C$ having a value of fifteen degrees (15°) greater than the first contact angle $\alpha 1$, and which has been revolved about the central axis $A_C$. Also, the second circumferential boundary line $BL_2$ is defined as the intersection of the cylindrical boundary surface $BS_1$ by any straight line $LS_2$ extending from the inboard pitch circle $PC_1$ in a direction toward the outer hub inboard axial end 40a, which forms an angle $\gamma_1$ with respect to any plane (e.g., $PL_1$) perpendicular to the central axis $A_C$ having a value of forty-five degrees (45°), and which has been revolved about the central axis $A_C$.

Similarly, for monitoring the outboard ballset 19, the second continuous circumferential sensor mounting surface section 23B or the second set 27B of arcuate mounting surface sections 25 is located axially between third and fourth circumferential boundary lines $BL_3$, $BL_4$, respectively, on a second cylindrical boundary surface $BS_2$ having a diameter of twice the radial spacing distance $RS_2$. It must be noted that, as the radial spacing distance $RS_1$ for the inboard sensor set 21A may be different than the radial spacing distance $RS_2$ for the outboard sensor set 21B, the boundary surfaces $BS_1$, 1352 may be merely coaxial rather than coincident (i.e., having the same diameter). In any case, the third circumferential boundary line $BL_3$ is defined as the intersection of the second cylindrical boundary surface $BS_2$ by any straight line $LS_3$ extending from the outboard pitch circle $PC_2$ in a direction toward the outer hub inboard axial end 40a, forming an angle $\beta_2$ with respect to any plane (e.g., $PL_2$) perpendicular the central axis $A_C$ having a value of fifteen degrees (15°) greater than the second contact angle $\alpha_2$, and which has been revolved about the central axis $A_C$. Further, the fourth circumferential boundary line $BL_4$ is defined as the intersection of the second cylindrical boundary surface $BS_2$ by any straight line $LS_4$ extending from the outboard pitch circle $PC_2$ in a direction toward the outer hub outboard axial end 40b, which forms an angle $\gamma_2$ with respect to any plane (e.g., $PL_2$) through the central axis $A_C$ having a value of forty-five degrees (45°), and which has been revolved about the central axis $A_C$.

With the design constraints described above, the outer hub 14 of the present wheel hub assembly 10 is formed to provide sensor mounting surface sections 20 positioned within prescribed radial and axial locations in order to avoid interference or "cross-talking". That is, measurements made by a sensor intended to only monitor one ballset may include strain generated by the other ballset, and this phenomena may be referred to as "cross-talking". Specifically, such interference results in the measurements taken by a specific sensor at a particular location on a hub being the combination of the strains generated by both ballsets, thus causing the measured values to be greater or lesser than the actual strain generated by the particular ballset being monitored.

Figure 23:
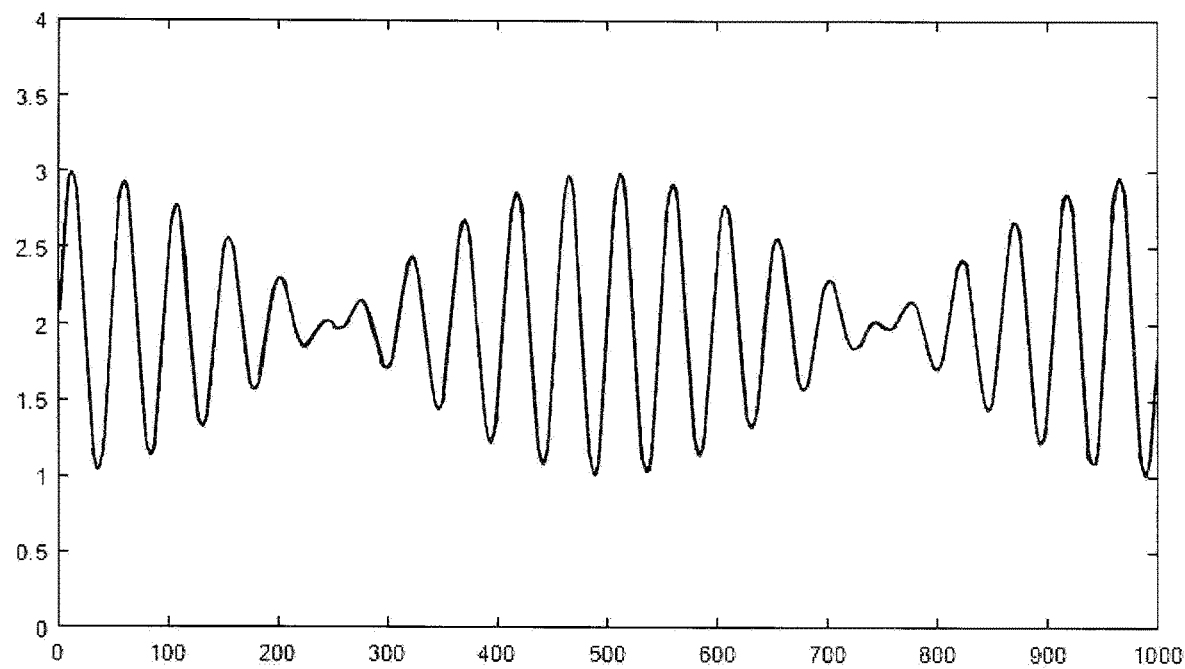
FIG. 23 is a graph showing the strain measured over a period of time by a specific sensor at a particular location on a prior art outer hub.

As a result, the strain measured over a period of time by a specific sensor at a particular location on an outer hub may appear generally as shown in the graph of FIG. 23. In the graph of FIG. 23, the y-axis indicates the amplitude of the measured strain and the x-axis is the elapsed time. As can be seen, the strain measured by a particular sensor at a specific location may appear over time as a distorted sine wave due to the detection of strain from the other "non-monitored" ballset.

Figure 24:
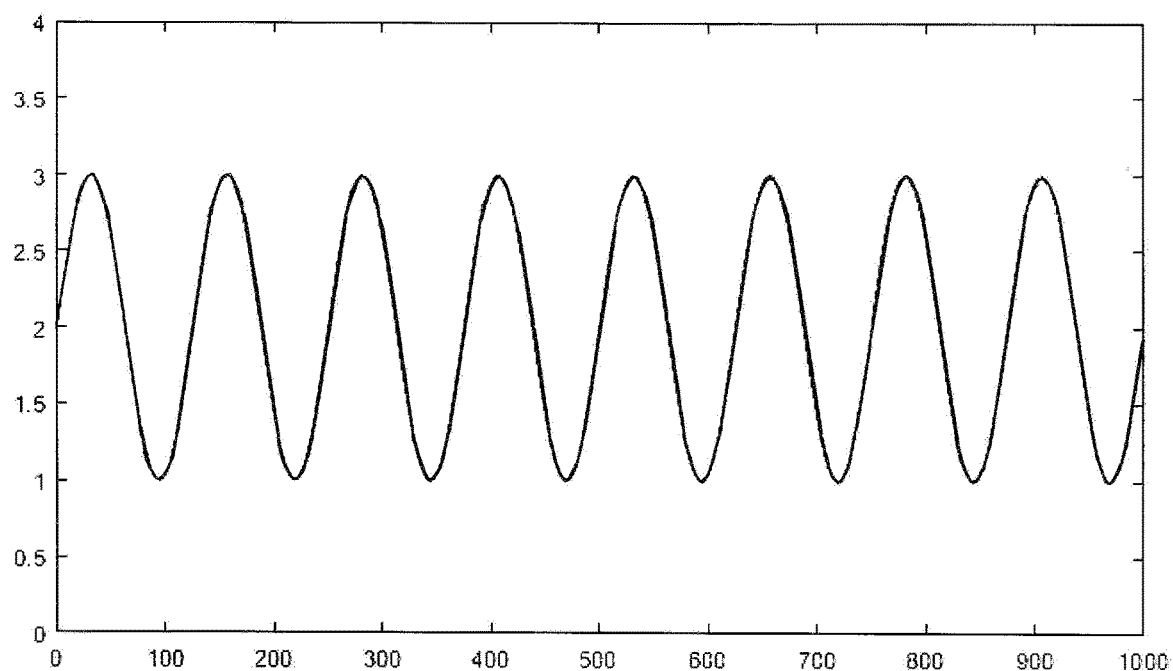
FIG. 24 is a graph showing the strain measured over a period of time by a specific sensor at a particular location on an outer hub of the present wheel hub assembly.

However, with the present wheel hub 14 provided with sensor mounting surface sections 22 located within the radial and axial boundaries described in detail above, each sensor 20 of the preferred two sensor sets 21A, 21B will only measure or detect strain from the one ballset 17 or 19 that the particular sensor 20 is intended to monitor. Specifically, the first set 21A of the sensors 20 is located on the outer hub 14 so as to detect strain generated by the first ballset 17 without any substantial detection of strain generated by the second ballset 19. Likewise, the second set 21B of the sensors 20 is located on the outer hub 14 so as to detect strain generated by the second ballset 19 without any substantial detection of strain generated by the first ballset 17. In other words, each sensor 20 is positioned such that any strains generated by the other ballset 19 or 17 (i.e., the ballset the sensor 20 is not intended to monitor) is substantially negligible and therefore not measured/detected by the specific sensor 20. Therefore, the measurements take by each sensor 20 over time will appear as shown in the graph of FIG. 24. As depicted in FIG. 24, the amplitude of the strain (y-axis) will continuously vary over time from a maximum value when a specific roller 16 or 18 passes the location of the sensor 20 and a minimum value when the sensor 20 is between two adjacent rollers 16 or 18. The measurements taken by any specific sensor 20 should appear as an unaltered or pure sine wave until an event occurs, such as damage to the races, an impact event experienced by the wheel hub assembly 10, etc.

Referring now to FIGS. 5-21, in order to position the continuous mounting surface sections 23A, 23B or the sets 27A, 27B of arcuate mounting surface sections 25 at the desired radial spacing distance $RS_1$, $RS_2$ and within the axial boundary lines $BL_1$, $BL_2$ or $BL_3$, $BL_4$, respectively, the outer hub 14 is either sized such that the mounting surface sections 22 are provided directly by the outer circumferential surface 42 (FIGS. 7-11), or the hub 14 is fabricated having continuous annular grooves (FIGS. 12-14) or a plurality of arcuate pockets 52 (FIGS. 15-21). Such grooves or pockets 52 are provided when the outer surface 42 of the outer hub 14 as formed is diametrically greater than the calculated radial boundary surface RB. Further, whether a particular hub 14 is provided with continuous grooves 50 or with arcuate pockets 52 depends on the availability of space for the sensor mounting surface sections 20 within the desired axial boundary lines $BL_1$, $BL_2$ and $BL_3$, $BL_4$ due to presence of structural features such as the mounting lugs 49, reinforcing flange(s), etc.

Figure 12:
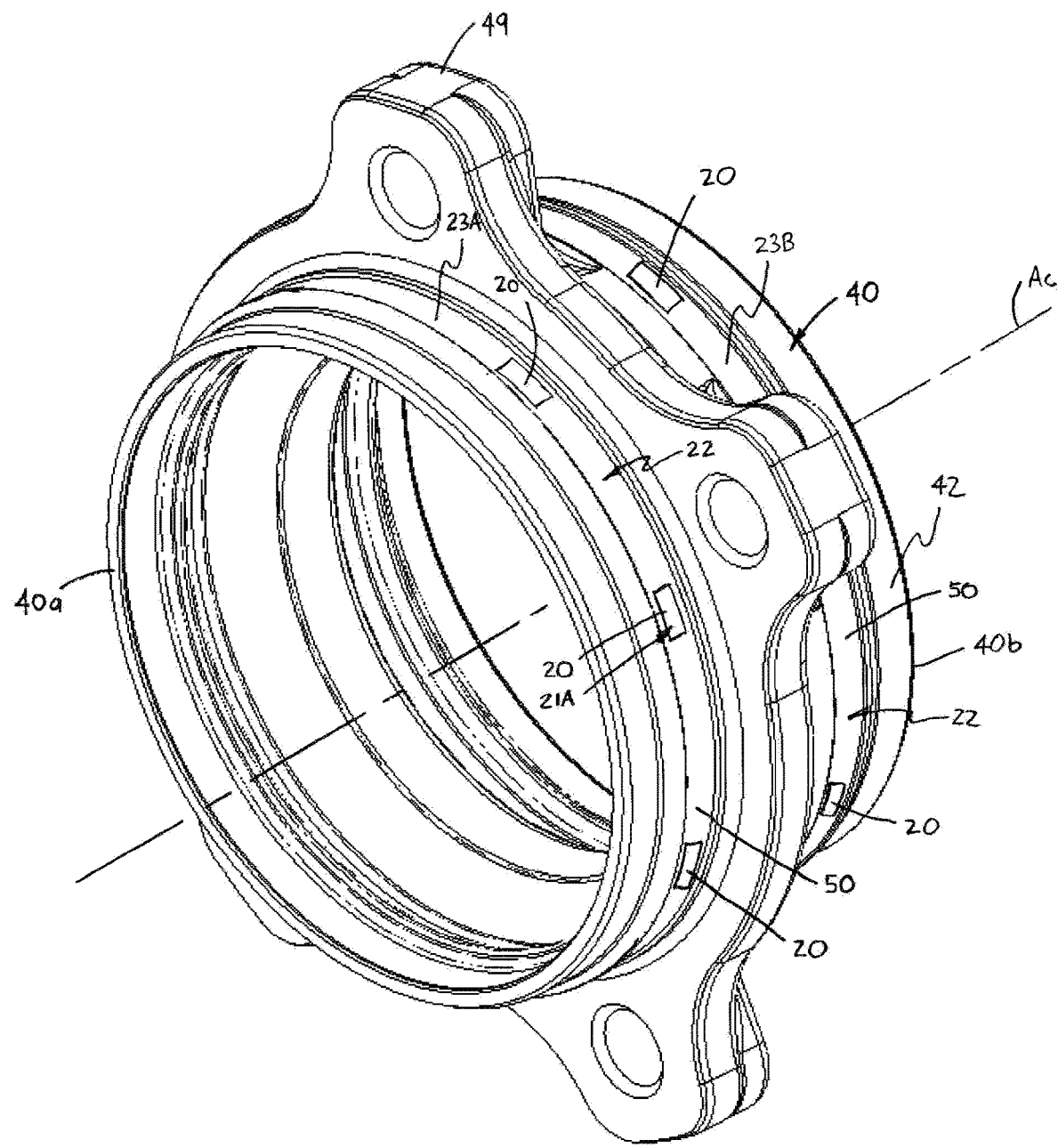
FIG. 12 is a perspective view of an outer hub taken from an inboard end, shown with continuous circumferential sensor mounting surface sections each formed in a groove.
Figure 13:
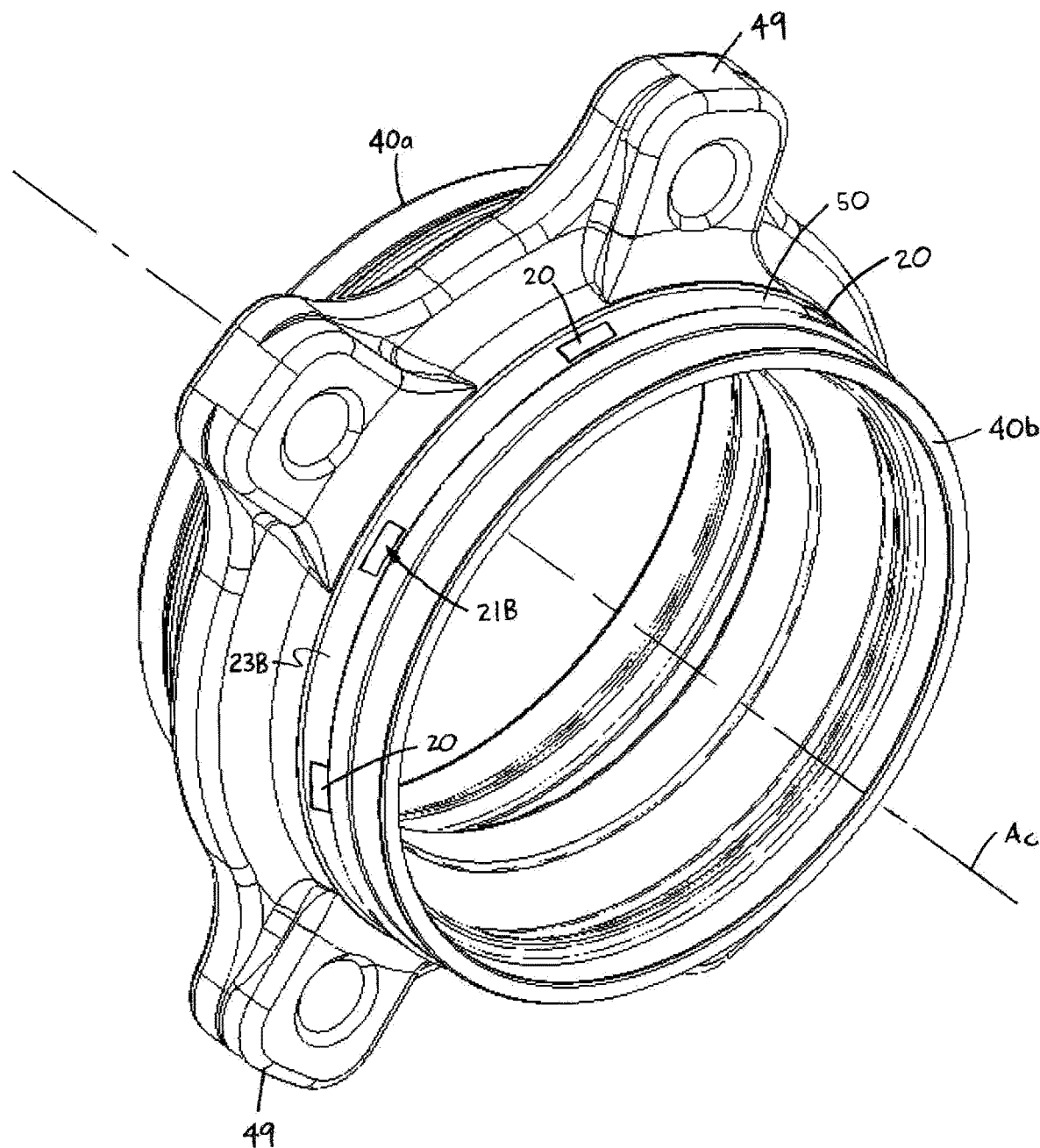
FIG. 13 is a perspective view of an outer hub of FIG. 12 taken from an outboard end, shown with continuous circumferential sensor mounting surface sections in grooves.
Figure 14:
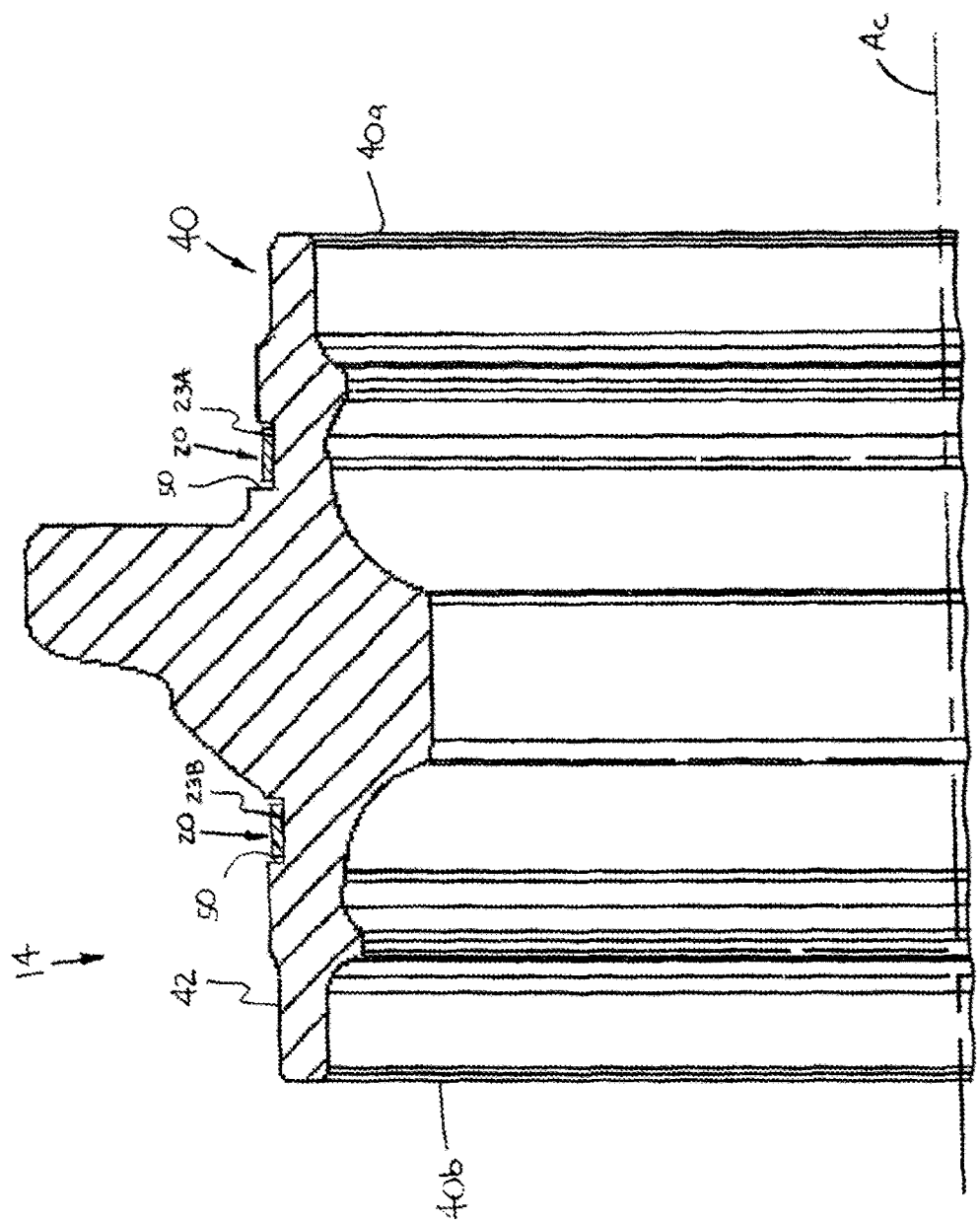
FIG. 14 is a broken-away, axial cross-sectional view of the outer hub of FIG. 12.
Figure 15:
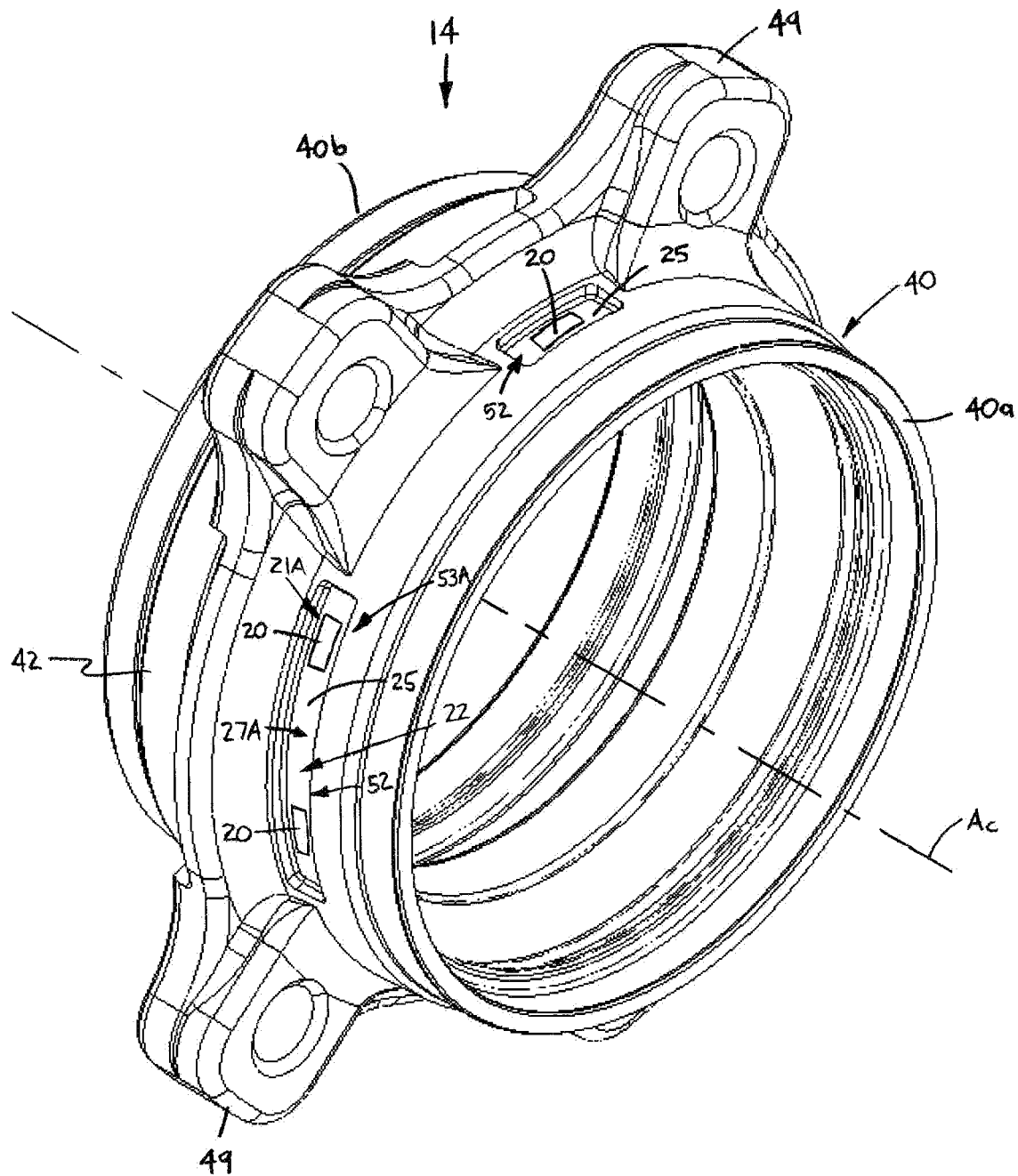
FIG. 15 is a perspective view of an outer hub taken from an inboard end, shown with a set of arcuate, circumferentially spaced pockets providing sensor mounting surface sections.
Figure 16:
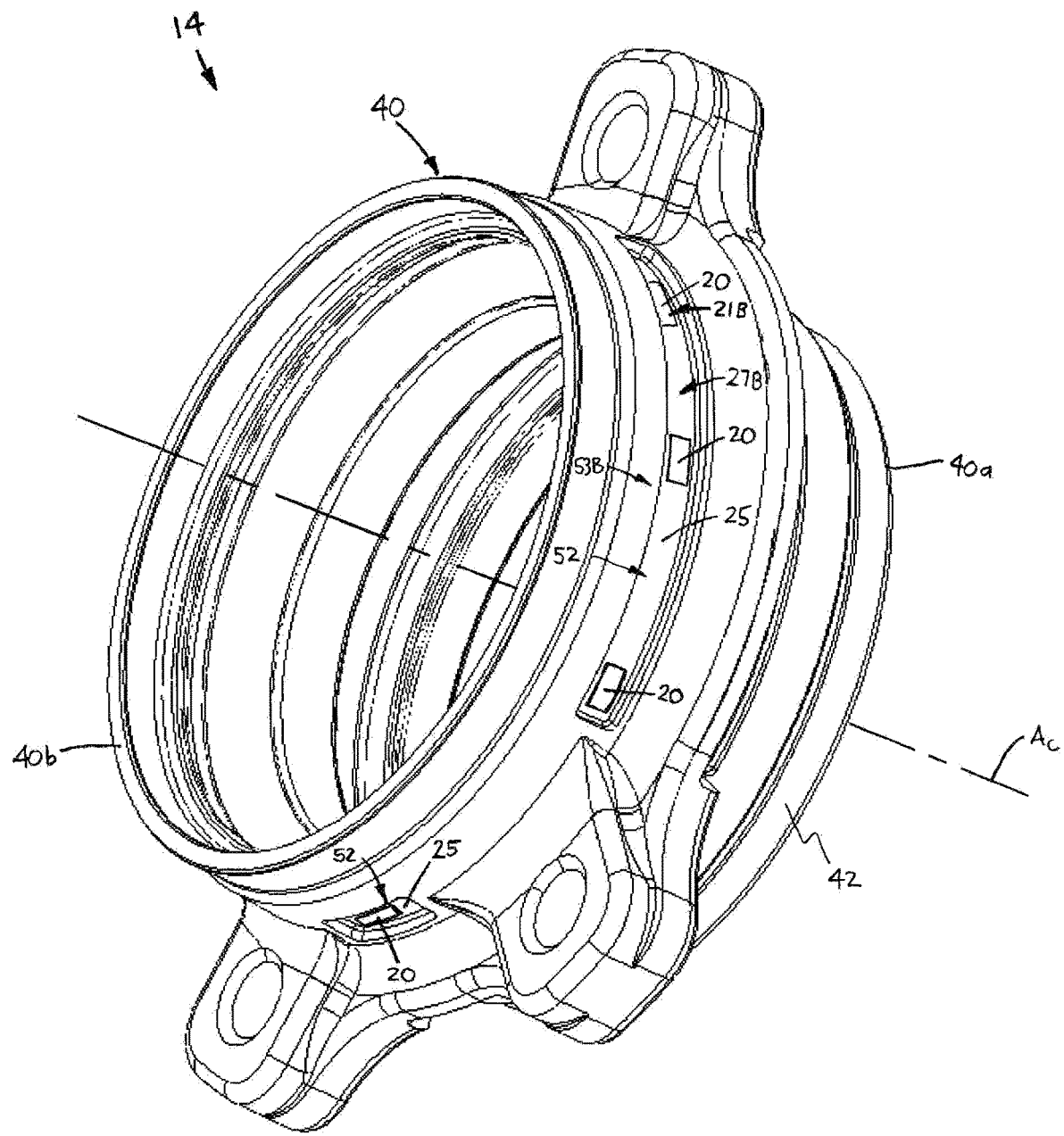
FIG. 16 is a perspective view of an outer hub of FIG. 15 taken from an outboard end, shown with the set of arcuate, circumferentially-spaced pockets.
Figure 17:
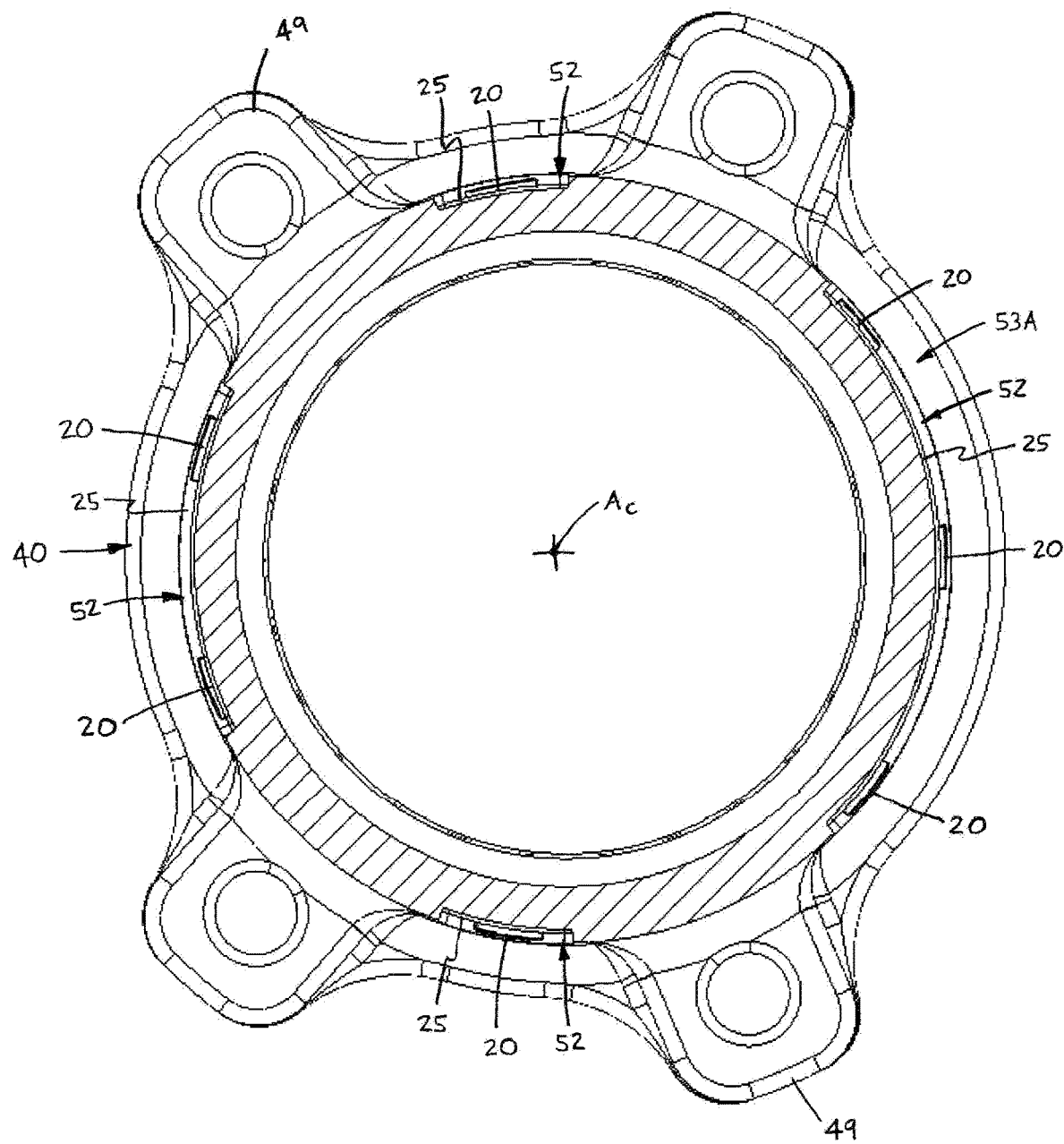
FIG. 17 is a radial cross-section of the hub of FIG. 15.
Figure 18:
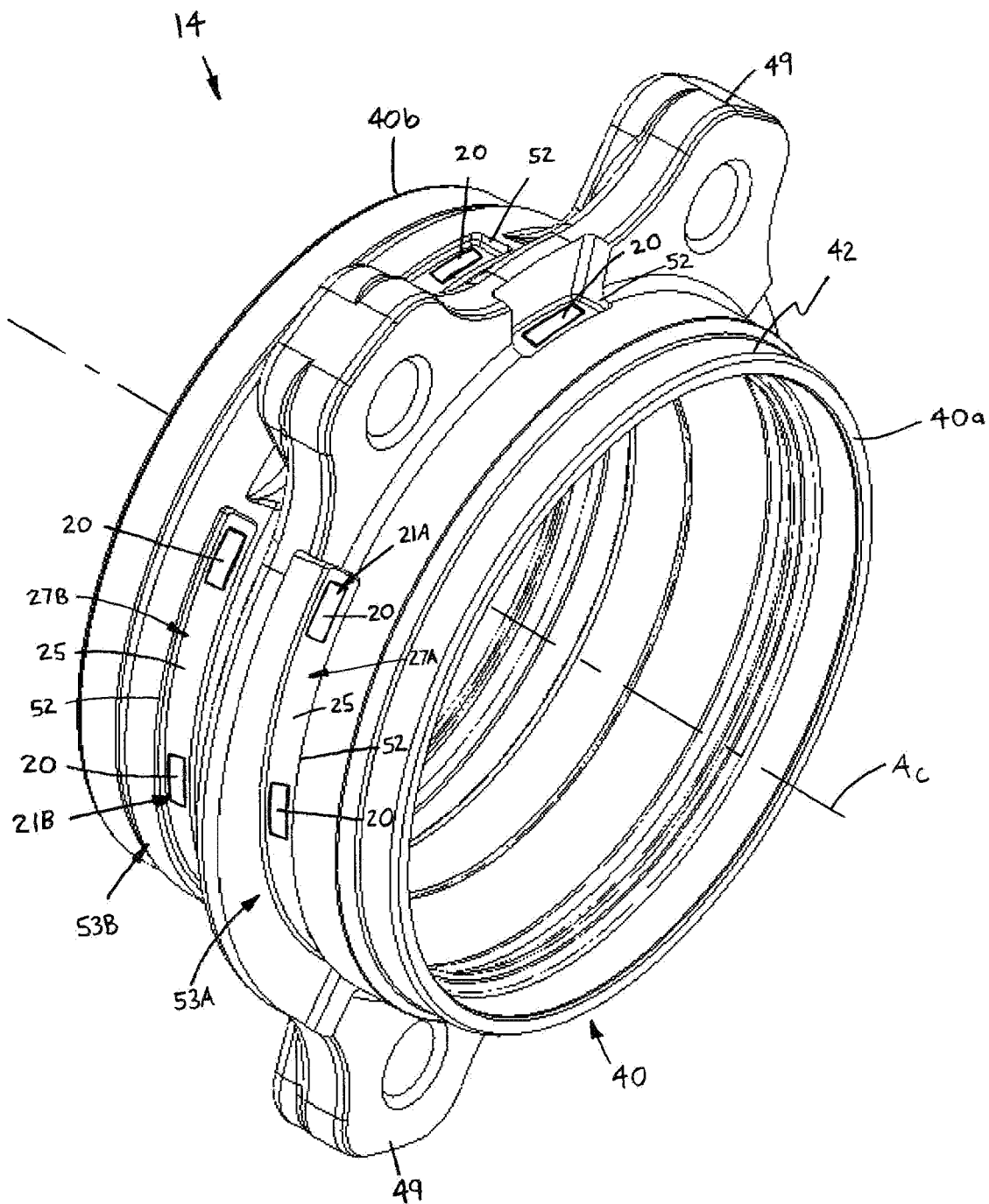
FIG. 18 is a perspective view of an outer hub taken from an inboard end, shown with a set of arcuate pockets machined in an annular reinforcing flange and providing the continuous circumferential sensor mounting surface sections.
Figure 19:
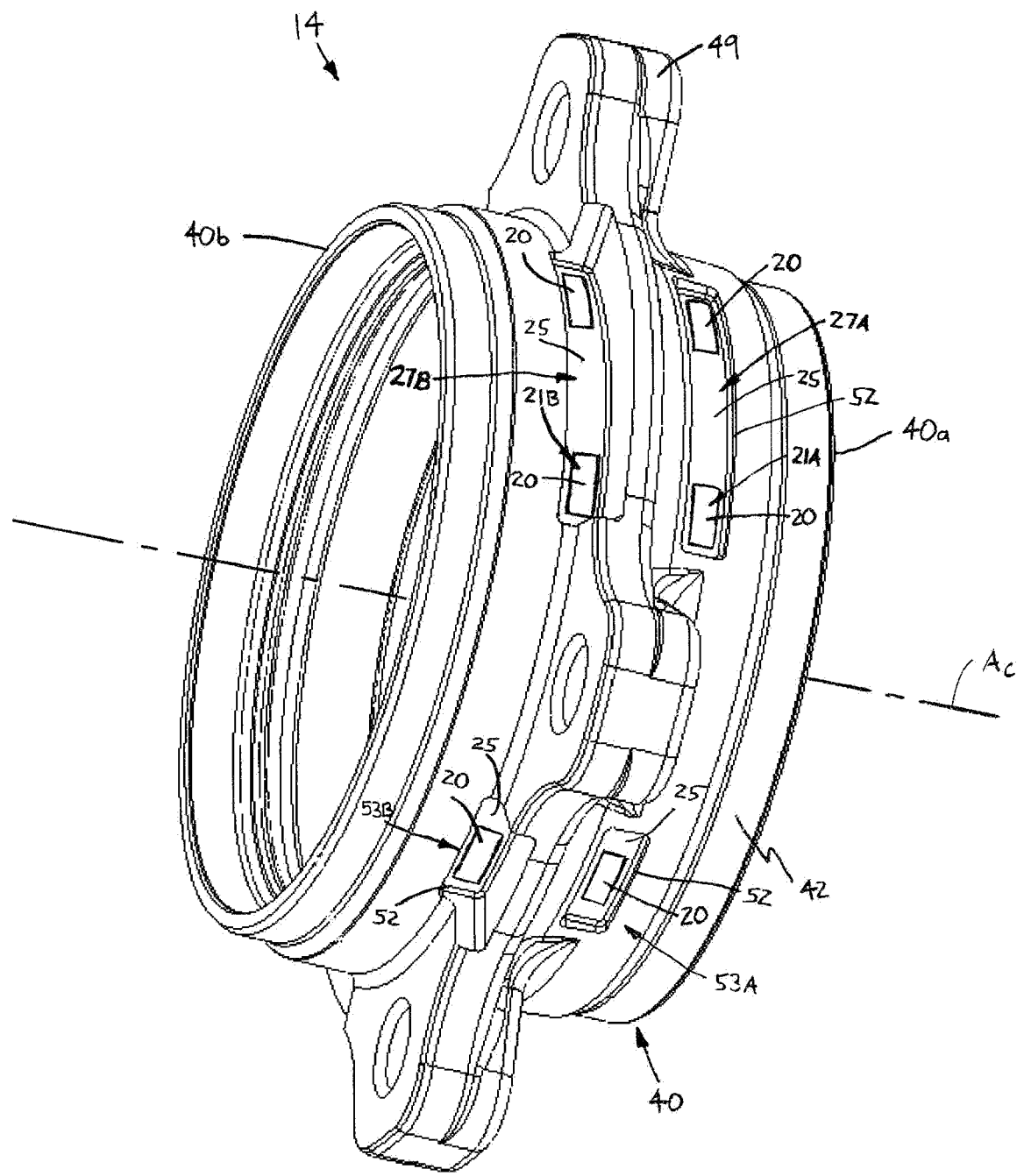
FIG. 19 is a perspective view of an outer hub of FIG. 18 taken from an outboard end, shown with the set of arcuate, circumferentially-spaced pockets.
Figure 20:
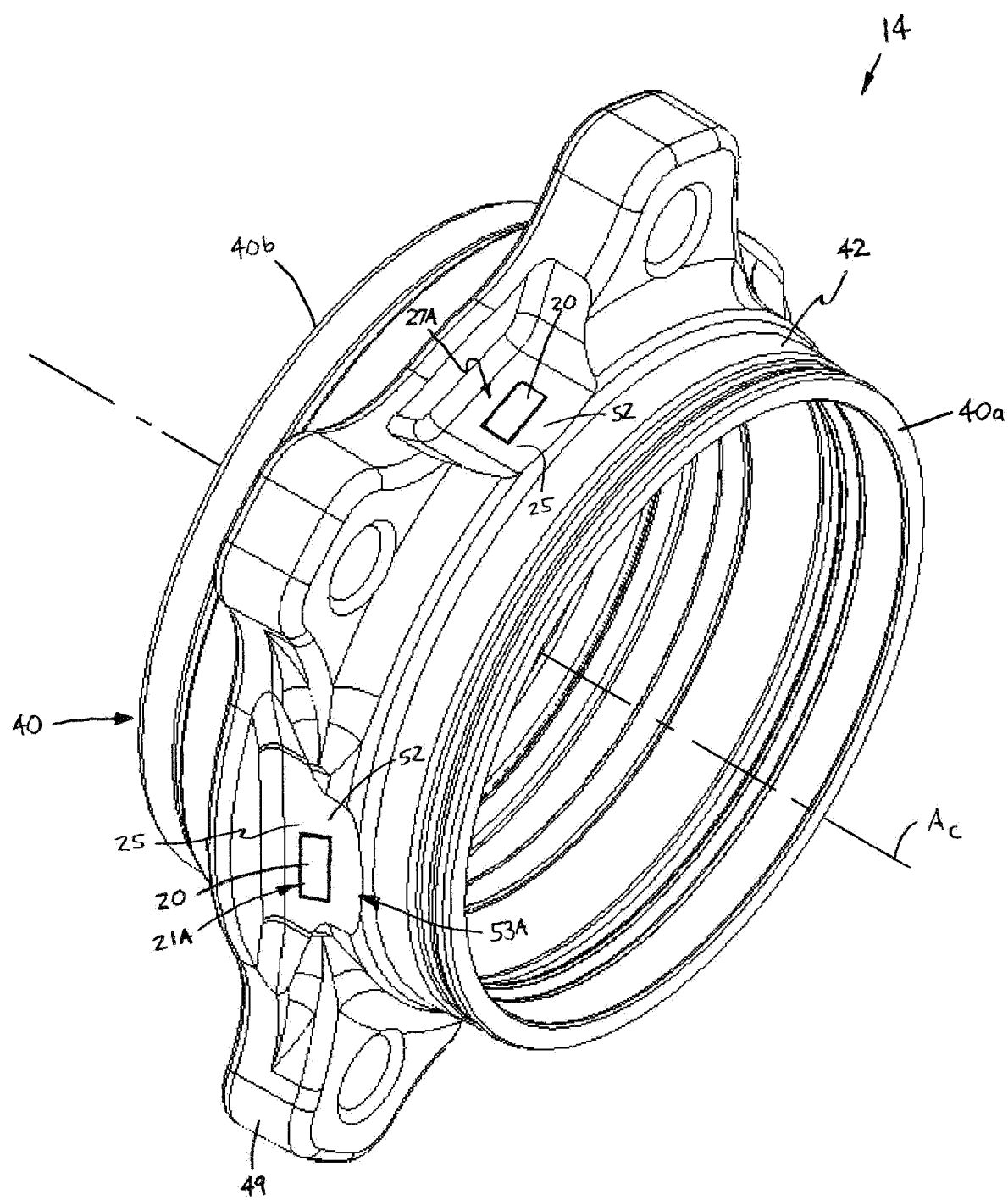
FIG. 20 is a perspective view of an outer hub taken from an inboard end, shown with a set of arcuate flats providing the continuous circumferential sensor mounting surface sections.
Figure 21:
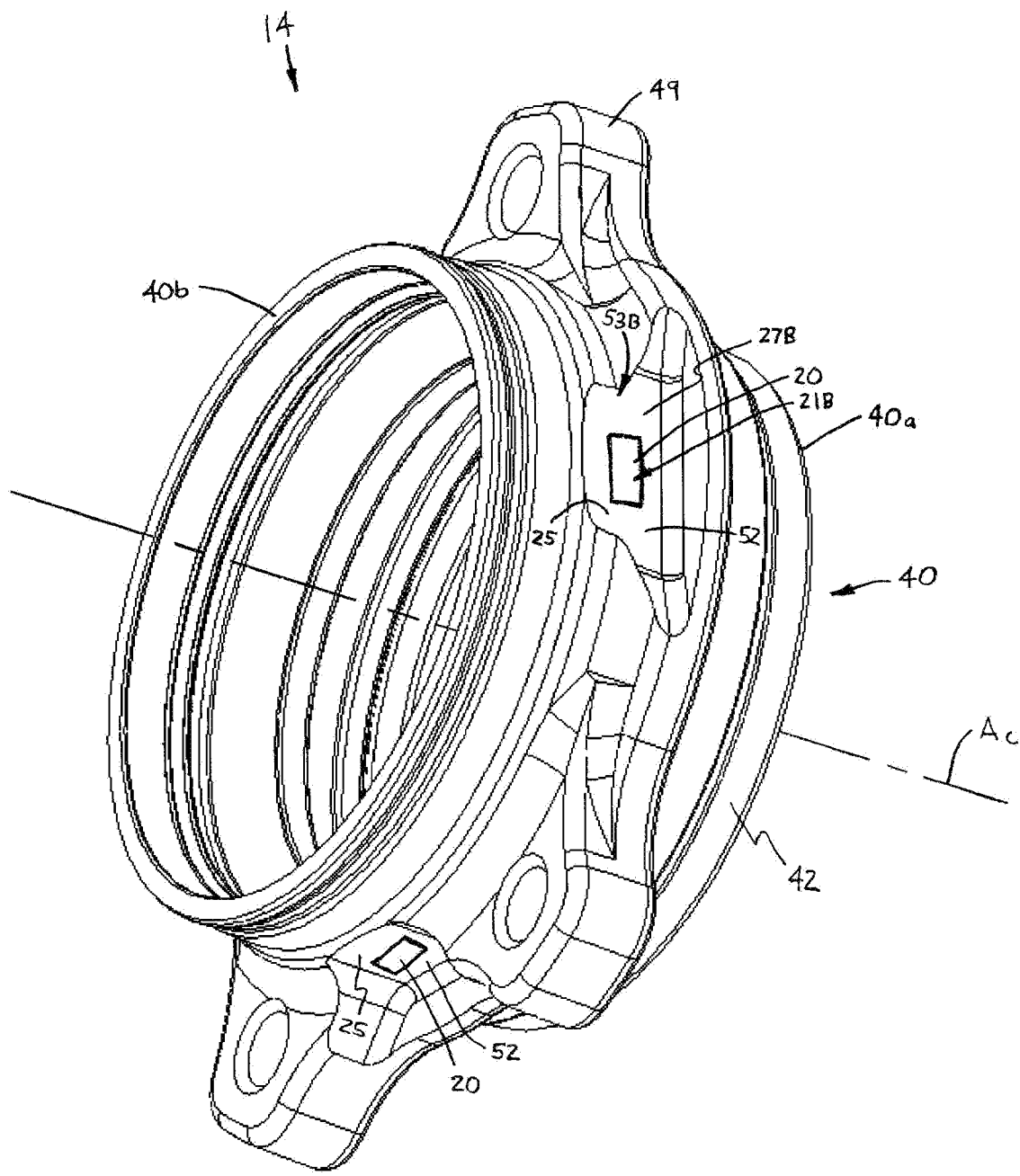
FIG. 21 is a perspective view of an outer hub of FIG. 20 taken from an outboard end, shown with the set of arcuate, circumferentially-spaced flats.

More specifically, in certain constructions shown in FIGS. 12-14, the outer hub 14 may be formed having first and second annular grooves 50A, 50B respectively, each extending radially inwardly from the outer circumferential surface 42 of the outer hub 14 and spaced axially apart, and providing first and second continuous circumferential sensor mounting surfaces 23A, 23B, respectively. In other constructions as shown in FIGS. 15-21, the outer hub 14 is constructed having first and second, axially-spaced sets 53A, 53B, respectively, of circumferentially spaced arcuate pockets 52 extending radially inwardly from the outer circumferential surface 42 of the outer hub 14. Each pocket 52 of the first arcuate pocket set 53A provides a separate one of the first set 27A of arcuate mounting surface sections 25 and the second arcuate pocket set 53B providing a separate one of the second set 27B of arcuate mounting surface sections 25. Further, each arcuate pocket 52 may formed as a curved groove section, as shown in FIGS. 12-16 or as a shallow flattened surface or "flat", as depicted in FIGS. 20 and 21. Although not depicted, the outer hub 14 may also be formed having a combination of one annular groove 50 and one set of arcuate pockets 52.

Referring particularly to FIG. 2, each sensor 20 of the two preferred sets 21A, 21B of sensors 20 is preferably a strain gauge 54 arranged to detect circumferential strain within the outer hub 14 and/or axial strain within the outer hub 14 (or within the inner hub 12 in certain constructions). Each strain gauge 54 includes a substrate and a sensitive element (neither indicated), may be of any appropriate type and attached to the hub 14 by any appropriate means, and may either include a separate substrate attached to the hub 14 or the hub 14 itself may provide the substrate for an attached sensitive element. The sensitive element of each strain gauge 54 may be a thin film such as a metal foil, a thick film such as a piezoresistive material, a silicon chip, a piezoelectric ceramic, etc., and the sensor substrate may be the bearing steel, a separate metal such as stainless steel, a ceramic, etc. Also, the sensitive element of each strain gauge 54 may be bonded to the substrate by printing, laser deposit, gluing, etc. and the substrate may be bonded to the hub 14 by gluing, welding (particularly for metallic substrates), brazing, etc. However, the sensors 20 may be any other type of strain gauge, or any other type of sensor capable of sensing strain, such as an optical strain sensors, etc.

Figure 22:
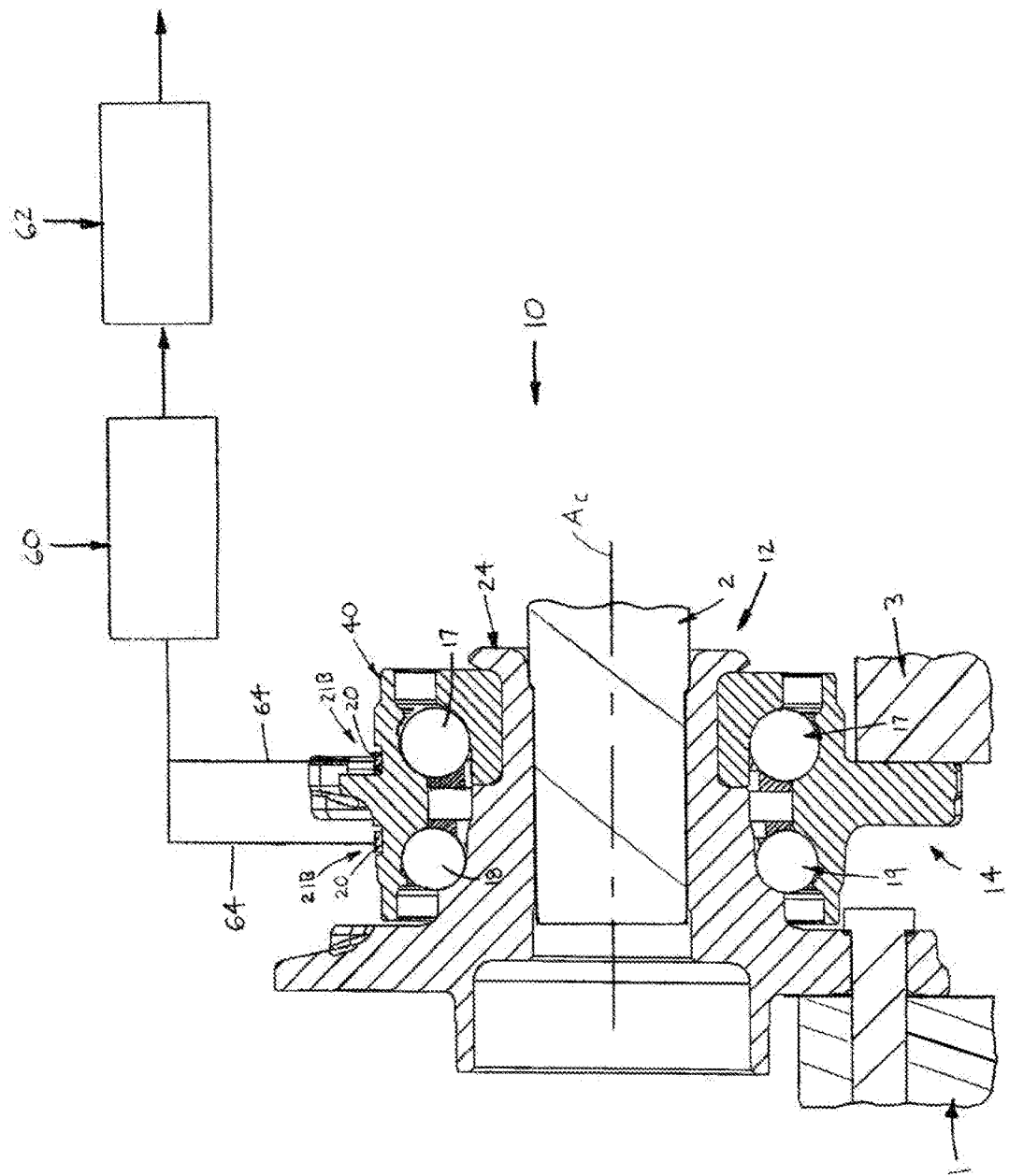
FIG. 22 is a more schematic view of the wheel hub assembly in partial axial cross-section, showing a preferred signal conditioner and processor.

Referring specifically to FIG. 22, the wheel hub assembly 10 preferably further comprises, or is at least configured to electrically connect with, a signal conditioner 60 and a processor 62. Specifically, the signal conditioner 60 is electrically connected with each sensor 20 of the first set of sensors 21A and with each sensor 20 of the second set 21B of sensors 20. The conditioner 60 is configured to receive signals from each sensor 20 and to digitally convert, amplify and/or filter each signal for additional processing. That is, it is typically necessary to convert an analog signal to a digital signal for analysis by a processor or other device and signals sensing strain from rolling elements are typically low amplitude, such that amplification enhances the ability to process the signal information. Also, when there are known frequencies that may be generated from sources other than the rolling elements 16, 18 (i.e., noise), filtering such signals also improves the information received from the sensors 20 and eliminates extraneous information.

Further, the processor 62 is electrically connected with the signal conditioner 60 or directly with each sensor 20 of the first and second sensor sets 21A, 21B (i.e., if the processor 62 has integral signal processing circuitry). In any case, the processor 62 is configured to determine loading at discrete positions about the circumference of the outer hub 14 by analyzing the signals received from the conditioner 60 or directly from the sensors 20. Thereby, the loading information can be sent to another controller or processor (none shown) to convert the strain information into loading, i.e., force and moments on the hub 14, for example to execute certain functionality, to operate other vehicle systems (e.g., brakes) or to merely provide a warning. For example, an increase in detected strain of a certain magnitude may indicate an imminent failure of the wheel hub assembly 10.

Still referring to FIG. 22, it is currently preferred to have a separate wire 64 extending from each sensor 20 of the first set 21A of sensors 20 and from each sensor 20 of the second set 21B of sensors 20 to the signal conditioner 60. However, the sensors 20 of the two preferred sensor sets 21A, 21B may be "wired" to the signal conditioner 60, or directly to the processor 62, in any appropriate manner. Alternatively, the sensors 20 of one or both sensor sets 21A, 21B may be configured to wirelessly communicate with the signal conditioner 60 or with the processor 62.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. A sensorized wheel hub assembly for rotatably connecting a wheel with a shaft and a chassis, the hub assembly comprising:

an inner hub rotatable about a central axis and having opposing inboard and outboard axial ends, a radial flange extending outwardly from the outboard axial end and connectable with the wheel, an inner circumferential surface defining a central bore for receiving the shaft, and an opposing outer circumferential surface, the outer surface providing an inboard inner race and an outboard inner race spaced axially from the inboard inner race;

an outer hub disposed about the inner hub, connectable with the chassis and having inboard and outboard axial ends, an outer circumferential surface and an inner circumferential surface, the inner surface providing an inboard outer race and an outboard outer race spaced axially from the inboard outer race;

a first ball set of first rollers disposed between the inboard inner race and the inboard outer race and contacting the inboard outer race along a first circular contact path, the center of each first roller traversing a first pitch circle about the central axis, any line perpendicular to the contact path and extending between the contact path and the pitch circle defining a first angle (α1) with respect to any radial plane through the central axis and intersecting the central axis at a first intersection point;

a second ball set of second rollers disposed between the outboard inner race and the outboard outer race and contacting the outboard outer race along a second circular contact path, the center of each second roller traversing a second pitch circle about the central axis, any line perpendicular to the second contact path and extending between the second contact path and the second pitch circle defining a second angle ($\alpha 2$) with respect to any radial plane through the central axis and intersecting the central axis at a second intersection point, the first and second intersection points being spaced apart by an axial distance (DA); and at least one sensor configured to sense strain within the outer hub generated by one of the first and second ballsets;

wherein the outer hub has at least one exterior sensor mounting surface section located a radial spacing distance (RS) from the central axis, the at least one sensor being disposed on the mounting surface section, the radial spacing distance having a value less than a radial boundary distance (RB) defined as follows:

$$RS<RB=[DA\times\sin(90°-\alpha 1)\times\sin(90°-\alpha 2)]/\sin(\alpha 1+\alpha 2)$$

wherein the at least one exterior senor mounting surface of the outer hub includes one of first and second axially spaced continuous circumferential sensor mounting surface sections, first and second axially spaced sets of a plurality of circumferentially spaced arcuate mounting surface sections, and one continuous circumferential mounting surface and one set of a plurality of circumferential spaced arcuate mounting surface sections, and the at least one sensor includes first and second sets of the sensors, each sensor of the first set of sensors being disposed on one of the first continuous circumferential surface section, the first set of circumferentially spaced arcuate mounting surface sections and the one continuous circumferential mounting surface section, each sensor of the second set of sensors being disposed on one of the second continuous circumferential mounting surface, the second set of circumferentially spaced arcuate mounting surface sections, and the one set of circumferentially spaced arcuate mounting surface sections;

wherein the first continuous circumferential sensor mounting surface section or the first set of arcuate mounting surface sections is located axially between first and second circumferential boundary lines on a first cylindrical boundary surface having a diameter of twice the radial spacing distance, the first circumferential boundary line being defined as the intersection of the cylindrical boundary surface by any straight line extending from the pitch circle in a direction toward the outer hub outboard axial end, forming an angle with respect to any plane perpendicular to the central axis having a value of fifteen degrees greater than the first contact angle, and revolved about the central axis, and the second circumferential boundary line being defined as the intersection of the cylindrical boundary surface by any straight line extending from the pitch circle in a direction toward the outer hub inboard axial end, forming an angle with respect to any plane perpendicular to the central axis having a value of forty degrees, and revolved about the central axis; and wherein the second continuous circumferential sensor mounting surface section or the second set of arcuate mounting surface sections is located axially between third and fourth circumferential boundary lines on a second cylindrical boundary surface having a diameter of twice the radial spacing distance, the third circumferential boundary line being defined as the intersection of the cylindrical boundary surface by any straight line extending from the pitch circle in a direction toward the outer hub inboard axial end, forming an angle with respect to any plane perpendicular to the central axis having a value of fifteen degrees greater than the second contact angle, and revolved about the central axis and the fourth circumferential boundary line being defined as the intersection of the cylindrical boundary surface by any straight line extending from the pitch circle in a direction toward the outer hub outboard axial end, forming an angle with respect to any plane perpendicular to the central axis having a value of forty degrees, and revolved about the central axis.

2. The wheel hub assembly as recited in claim 1 wherein a first radial thickness is defined between the inboard outer race and the at least one mounting surface section and a second radial thickness is defined between the outboard outer race and the at least one sensor mounting surface section, each one of the first and second radial thicknesses has a value of at least three millimeters.

3. The wheel hub assembly as recited in claim 1 wherein:
the first set of the sensors is located on the outer hub so as to detect strain generated by the first ballset without any substantial detection of strain generated by the second ballset; and
the second set of the sensors is located on the outer hub so as to detect strain generated by the second ballset without any substantial detection of strain generated by the first ballset.

4. The wheel hub assembly as recited in claim 1 wherein the outer hub has one of:
a first annular groove extending radially inwardly from the outer circumferential surface of the outer hub and providing the first continuous circumferential sensor mounting surface and a second annular groove extending radially inwardly from the outer circumferential surface of the outer hub, spaced axially from the first annular groove and providing the second continuous circumferential sensor mounting surface; and
a first set of circumferentially spaced arcuate pockets extending radially inwardly from the outer circumferential surface of the outer hub and each providing a separate one of the first set of arcuate mounting surface sections and a second set of circumferentially spaced arcuate pockets extending radially inwardly from the outer circumferential surface of the outer hub, spaced axially from the first set of arcuate pockets, and each providing a separate one of the second set of arcuate mounting surface sections.

5. The wheel hub assembly as recited in claim 1 further comprising at least one of:
- a signal conditioner electrically connected with each sensor of the first set of sensors and with each sensor of the second set of sensors, the conditioner being configured to receive signals from each sensor and to at least one of digitally convert, amplify and filter each signal; and
- a processor electrically connected with the signal conditioner or with each sensor of the first set of sensors and with each sensor of the second set of sensors, the processor being configured to determine loading at discrete positions about the circumference of the outer hub by analyzing signals received from the conditioner or from the sensors.

6. The wheel hub assembly as recited in claim 5 wherein each sensor of the first set of sensors and each sensor of the second set of sensors is configured to wirelessly communicate with the signal conditioner or with the processor.

7. The wheel hub assembly as recited in claim 1 wherein the at least one sensor is a strain gauge arranged to detect at least one of circumferential strain within the outer hub and axial strain within the outer hub.

* * * * *